US012248343B2

(12) United States Patent
Shenoy et al.

(10) Patent No.: US 12,248,343 B2
(45) Date of Patent: Mar. 11, 2025

(54) HIGH-DENSITY STORAGE SYSTEM STRUCTURE

(71) Applicant: Hyve Solutions Corporation, Fremont, CA (US)

(72) Inventors: Jayarama Narayan Shenoy, San Jose, CA (US); Chiaming Liu, Taoyuan (TW); Chihwei Lee, Taipei (TW); John Will Wallerich, Sunnyvale, CA (US); Robert Michael Kinstle, III, Livermore, CA (US); ChungTa Huang, New Taipei (TW); Yung-Ning Mo, Taoyuan (TW); Chia-Yung Lin, Taipei (TW); Hsuanju Shen, New Taipei (TW)

(73) Assignee: Hyve Solutions Corporation, Fremont, CA (US)

( * ) Notice: Subject to any disclaimer, the term of this patent is extended or adjusted under 35 U.S.C. 154(b) by 227 days.

(21) Appl. No.: 18/115,555

(22) Filed: Feb. 28, 2023

(65) Prior Publication Data
US 2024/0288914 A1     Aug. 29, 2024

(51) Int. Cl.
G06F 1/18     (2006.01)
(52) U.S. Cl.
CPC .................................. G06F 1/185 (2013.01)
(58) Field of Classification Search
CPC ........... G06F 1/187; G06F 1/20; H05K 1/189; H05K 3/4007; H05K 7/1487; H05K 7/1498; H05K 7/1457; G11B 33/128; G11B 33/122; G11B 33/0461; G11B 33/08; G11B 33/142; G11B 33/12; G11B 33/126
See application file for complete search history.

(56) References Cited

U.S. PATENT DOCUMENTS

| 8,037,243 B1 * | 10/2011 | Gasser | G06F 9/4401 |
| | | | 711/111 |
| 9,513,677 B2 * | 12/2016 | Huang | G06F 1/187 |
| 10,431,261 B2 * | 10/2019 | Amin-Shahidi | H01R 12/613 |
| 11,032,934 B1 * | 6/2021 | Adrian | G11B 33/122 |
| 2007/0083690 A1 | 4/2007 | Koga et al. | |

(Continued)

FOREIGN PATENT DOCUMENTS

| CN | 108829561 | 11/2018 |
| CN | 112055499 | 12/2020 |

OTHER PUBLICATIONS

U.S. Appl. No. 18/115,558, filed Feb. 28, 2023, Shenoy et al.

(Continued)

*Primary Examiner* — Abhishek M Rathod
(74) *Attorney, Agent, or Firm* — Fish & Richardson P.C.

(57) ABSTRACT

Aspects of the embodiments are directed to a rack server that includes a rack server chassis; a plurality of backplane printed circuit boards (PCBs) coupled to the rack server chassis, each backplane PCB comprising a plurality of cantilevered beams, each cantilevered beam of the plurality of cantilevered beams comprising a receiver slot to receive a server element; and a serial attached small computer serial interface (SAS) expander circuit element residing on each backplane PCB, the SAS expander circuit element electrically connected to the receiver slot of each cantilevered beam of the plurality of cantilevered beams. The rack server comprises a 5 RU height.

17 Claims, 20 Drawing Sheets

(56) References Cited

U.S. PATENT DOCUMENTS

| | | | |
|---|---|---|---|
| 2009/0310303 A1* | 12/2009 | Najbert | G11B 33/142 361/695 |
| 2012/0113582 A1* | 5/2012 | Hirano | G06F 1/20 312/319.1 |
| 2013/0258580 A1* | 10/2013 | Nakayama | G11B 33/128 361/679.33 |
| 2015/0268702 A1 | 9/2015 | Huang et al. | |
| 2018/0270965 A1 | 9/2018 | Liu et al. | |
| 2019/0069437 A1 | 2/2019 | Adrian et al. | |
| 2019/0156866 A1 | 5/2019 | Wilke et al. | |
| 2020/0146161 A1 | 5/2020 | Zack et al. | |
| 2021/0274674 A1 | 9/2021 | Wang et al. | |
| 2022/0292044 A1 | 9/2022 | Frink et al. | |

OTHER PUBLICATIONS

International Search Report and Written Opinion in International Application No. PCT/US2024/017519, mailed on Jun. 24, 2024, 10 pages.

International Search Report and Written Opinion in International Application No. PCT/US2024/017623, mailed on Jun. 25, 2024, 10 pages.

* cited by examiner

HIGH-DENSITY STORAGE SYSTEM STRUCTURE

BACKGROUND

Servers are high-powered computing systems that can store, process, and manage large amounts of data. Servers can include a number of components, including hardware processors, hard drive storage devices, power distribution units, network interface controller units, and other elements that provide the functionality desired for the server.

SUMMARY

This disclosure is directed to a structure for organizing hard drive storage devices for a rack server. Aspects of the embodiments are directed to a rack server that includes a modular hard disk backplane printed circuit board (PCB) design to replace a large monolithic backplane typical in state-of-the-art systems. The modular backplane PCB can improve the manufacturability of the storage server.

In embodiments, the SAS protocol fan out expander circuit can be placed in the middle of modular backplane PCB (e.g., near a connection point between two PCBs that form the modular backplane PCB) to minimize the trace lengths of the high speed signals from the SAS expander to the hard disk and to establish a one-dimensionality to the trace directions.

The modular design can be achieved by increasing the overall height of the rack server to 5 RU or approximately 5 RU. The additional height provides extra space below the backplane PCB for trace routing, airflow cooling, power delivery, and other advantages. Placing power delivery points in the middle of the modular backplanes can minimize the power delivery distance to the hard drives.

The modular backplane PCB is designed so that the signals from the expander circuit are predominantly oriented axially along the long axis of the backplane PCB, which keeps trace lengths short. The longest trace length is from the expander circuit to the edge of one of the modular backplane PCBs, instead of across a monolithic board.

An additional advantage to signal unidirectionality is that a notches can be formed in the PCB. These notches are used for both vibration isolation and for improving the thermal design of the system. One use for these notches is to set up vertical air flow. Air flow diverters placed underneath the backplane PCB can cause cooler air from the space beneath the backplane PCB to flow towards HDDs near the middle and rear of the rack server, thereby providing cooling for HDDs that might not otherwise experience cooling from fan-based airflow. This arrangement ensures fresh air to even the last row of HDDs. And this design can improve the thermal performance of large storage systems by almost 2×. The air flow diverters are made possible by the additional space available underneath the HDD backplane. So, a combination of mechanical design and electrical design elements enable a significant improvement in the thermal performance.

The notches also partially isolate the area around the HDD connector. This partial isolation reduces the vibration transmission to and from the HDD via the HDD backplane PCB. A vibration dissipation element can be added beneath each HDD location even as HDDs are mounted to a common backplane PCB. Such an element minimizes vibration transfer out of or into a HDD by dissipating vibration energy immediately adjacent to the drive. The vibration dissipation element (or vibration dampener) can reside in the added space that comes from the increased rack server height.

Generally, the connectors for the HDD on the backplane PCB is designed as damped cantilever. The damped cantilever is made up of cantilevered beams formed on the backplane PCB itself, where each cantilevered beam carries one HDD connector. When the HDD backplane PCB is mounted into the system, it is assembled with an array of vibration dampeners such that each cantilevered beam mechanically rests on a corresponding one vibration dampener, thus creating a damped cantilever. The vibration dampeners are secured to the chassis of the rack server by a support rail that is offset from the bottom surface of the chassis by support beams.

Because the HDD backplane PCB is mounted on these vibration dampeners, the backplane PCB does not need any additional metallic chassis elements that are efficient conduits for vibrational energy. Since the damper also acts as a support to the backplane PCB and HDD, in this design the PCB area around each HDD can be aggressively notched to minimize vibration transfer through the backplane itself. So not only does the vibration dampener provide a vibration dissipation element, the vibration dampener also reduces the vibration transfer through the chassis structural elements and through the printed circuit board of the backplane itself. In addition, the presence of an array of dampers acts to mechanically support the cantilevered beams, which can be fragile considering the aggressive notching.

Aspects of the embodiments are directed to a rack server that includes a rack server chassis; a plurality of backplane printed circuit boards (PCBs) coupled to the rack server chassis, each backplane PCB including a plurality of cantilevered beams, each cantilevered beam of the plurality of cantilevered beams including a receiver slot to receive a server element; and a serial attached small computer serial interface (SAS) expander circuit element residing on each backplane PCB, the SAS expander circuit element electrically connected to the receiver slot of each cantilevered beam of the plurality of cantilevered beams.

In some embodiments, the plurality of cantilevered beams includes a first set of cantilevered beams proximate to a first end of each backplane PCB; a second set of cantilevered beams adjacent to the first set of cantilevered beams and residing towards a second end of each backplane PCB, the first end opposite the second end; and wherein the SAS expander circuit element resides at a location on each backplane PCB between the first set of cantilevered beams and the second set of cantilevered beams, and wherein the SAS expander circuit element is electrically connected to the receiver slot of each cantilevered beam of the first set and second set of cantilevered beams.

Some embodiments include a third set of cantilevered beams adjacent the second set of cantilevered beams, the second set of cantilevered beams between the third set of cantilevered beams and the SAS expander circuit element, wherein the SAS expander circuit element is electrically connected to the receiver slot of each cantilevered beam of the third set of cantilevered beams.

Some embodiments include a first set of electrical traces extending from the SAS expander circuit element to each receiver slot of the first set of cantilevered beams; a second set of electrical traces extending from the SAS expander circuit element to each receiver slot of the second set of cantilevered beams and the third set of cantilevered beams; wherein the first set of electrical traces extends towards the first end of each backplane PCB and the second set of electrical traces extends towards the second end of each backplane PCB.

Some embodiments include a PCB connector at the first end of each backplane PCB.

In some embodiments, each backplane PCB is a first backplane PCB and the plurality of cantilevered beams is a first plurality of cantilevered beams, the rack server further including a second backplane PCB mechanically and electrically connected to a PCB connector of the first backplane PCB, the second backplane PCB including a second plurality of cantilevered beams; and a second PCB connector electrically connecting the first backplane PCB and the second backplane PCB to a fan board.

Some embodiments include a plurality of first backplane PCBs connected to a plurality of second backplane PCBs.

In some embodiments, the first plurality of cantilevered beams of the first backplane PCB includes fifteen cantilevered beams and the second plurality of cantilevered beams of the second backplane PCB includes nine cantilevered beams.

In some embodiments, the each of the plurality of cantilevered beams includes an elongated region extending from each backplane PCB, the receiver slot residing on the elongated region, wherein the elongated region includes a distal end separated from each backplane PCB by an air gap; and at least one side separated from each backplane PCB by an air gap.

In some embodiments, the rack server chassis includes a plurality of receivers to secure each backplane PCB to the rack server chassis, the plurality of receivers to offset each backplane PCB from a bottom surface of the rack server chassis, each backplane PCB separated from the bottom surface of the rack server chassis by a gap.

Some embodiments include an air flow diverter extending from the bottom surface of the rack server chassis underneath each backplane PCB in the gap, the air flow diverter to direct air in the gap towards the backplane PCB.

Some embodiments include a fan to pull air from a front end of the rack server towards a back end of the rack server.

In some embodiments, the rack server chassis includes a 5 rack unit form factor.

In some embodiments, the server element includes a hard drive storage element and the receiver slot includes a connector to electrically connect the hard drive storage element to the backplane PCB.

Some embodiments include a power distribution unit residing proximate at least one of the SAS expander circuits.

Some embodiments include one or more of a node module including one or more of a motherboard, a network interface controller, and an interconnect module; a host bus adapter; two fan modules and eight fans; and two power supplies.

Some embodiments include 96 hard disk drives.

Some embodiments include a first section including two backplane PCBs, each backplane PCB of the first section including 24 hard disk drives; and a second section including two backplane PCBs, each backplane PCB of the second section including 24 hard disk drives.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

BRIEF DESCRIPTION OF THE DRAWINGS

Figures are not drawn to scale unless otherwise indicated. Like reference numbers and designations in the various drawings indicate like elements.

DETAILED DESCRIPTION

Figure 1A:
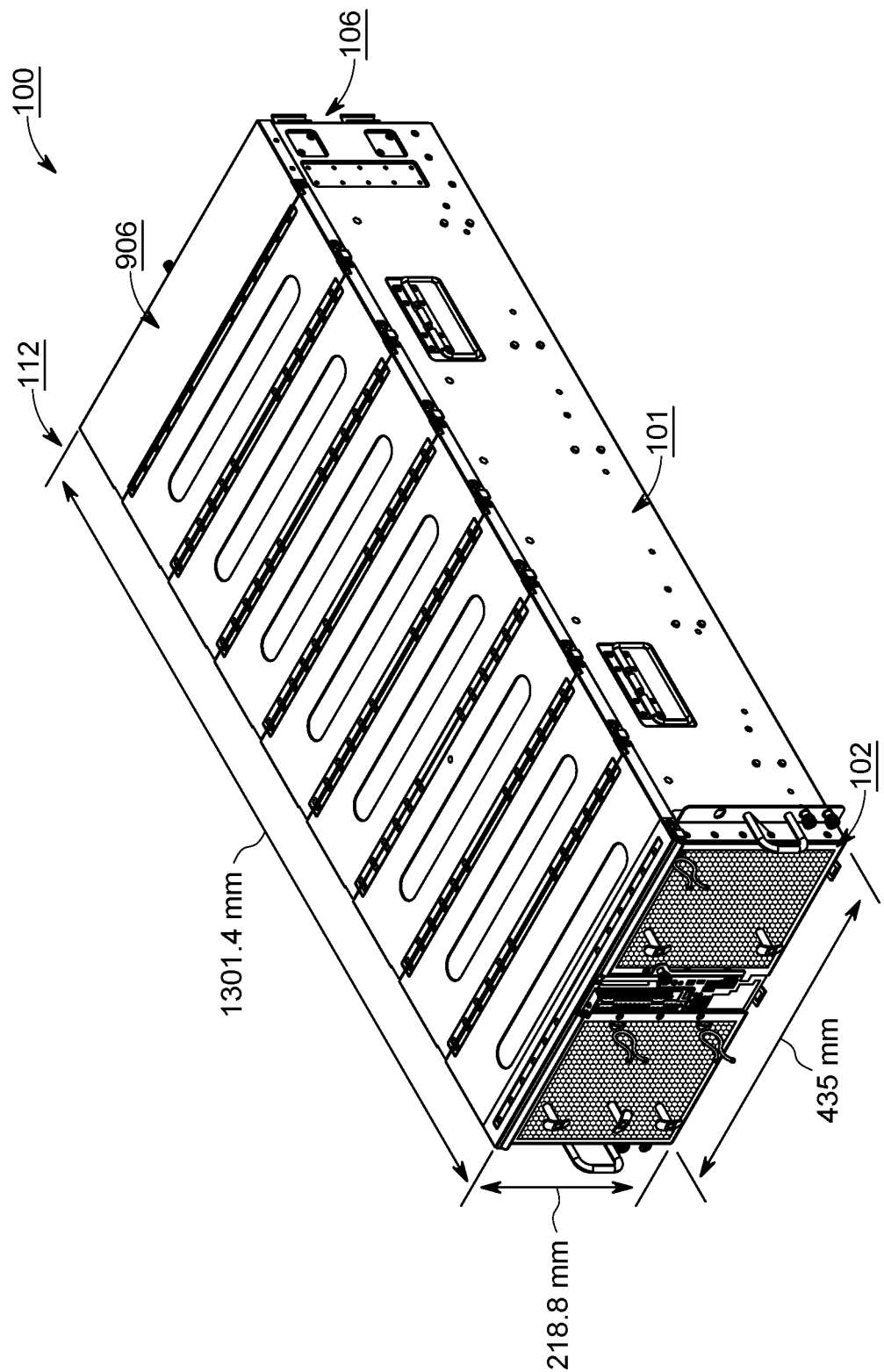
FIG. 1A is a schematic diagram of an isometric view of an example rack server in accordance with embodiments of the present disclosure.

The following detailed description describes a rack server that includes structural features that can accommodate high-density hard drive storage devices that rely on high-power. The structural features described herein can also address thermal management as well as vibration dampening. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The increase in hard drive storage device density and performance presents challenges with respect to the increasingly stringent requirements from the systems required to house them, such as power, speed, efficiency, cost, etc. A high-density storage system houses approximately one hundred hard drives, and while the number of drives has not decreased as performance and density improves, and the stringent requirements for housing the hard drives have not been relaxed.

For example, electrical requirements have increased from the 6 Gbps signaling speed of SATA to 12 Gbps of SAS3. Accordingly, power consumption of a hard disk has increased from 9 Watts to 13 watts to incorporate a second actuator head. Mechanically, the performance of the hard drives has resulted in vibrations that can negatively impact other hard drives. Thermal control has become more stringent to provide operating margin to the hard drives. In some implementations, hard drive performs diminishes after an increase beyond 10° C. from ambient. Manufacturability is also of concern, since balancing competing interests can be an encumbrance on manufacturability of the PCB or other components of the server rack.

This disclosure describes a rack server design that can address the electrical, thermal, vibrational, and manufacturability issues to support the increases in hard drive performance and density.

The structural design features described herein include the following:
1) a 5 RU system height;
2) a modular printed circuit board (PCB) design;
3) decentralized expander circuitry;
4) cantilevered beams, each of which carries a HDD receiver slots;
5) notches in each PCB for airflow; and
6) airflow diverters on the chassis to divert airflow from an open space into the HDD cages.

Each of these features will be described in more detail below. In this disclosure, the system height is 5 rack units (RU). (1 RU=1.75 inches 44.45 mm; 5 RU=8.75" or 222.25 mm). This increase in size nominally reduces the density of the storage system and facilitates the adoption of a modular system design where all the electrical, mechanical, thermal and manufacturability design constraints are able to be met in conjunction and do not conflict with each other. Noteworthy is that while increasing system height to 5 RU runs counter to density, the weight limits on server racks meant that data centers were not deploying more than 8 systems in a cabinet due to weight limits. And so going from 32 rack units to 40 rack units (adding 1 RU per rack server) was not a loss in overall density as server racks are usually 45 rack units tall. (Put simply, the total number of hard drives per cabinet is maintained, so there is no overall reduction in HDD density). So the RU height trade-off helps to accomplish the design goals described herein without materially affecting overall system design from a deployment scenario. In addition, the added rack unit can be used for airflow purposes, which would not contribute much to the overall weight of the cabinet.

In the rack server design described here (that can be used as storage servers), the rack server can accommodate 96 hard drives (the number of hard drives being a factor of commercially available SAS controllers). The rack server has a 5 RU enclosure to use some additional space to provide the following design improvements:

Electrical: in implementations, the longest PCB trace lengths are 21 inches and travelling only along one axis of the PCB. This is a reduction of PCB trace length of 49% and easily allows the operation of the electrical signals at 12 Gbps to meet higher speed SAS3 operation. For power delivery, the distance from the power drop to the farthest drive is 19 inches, a reduction of distance of 50% in the power delivery resistance. As a result, hard drives with higher power consumption can be accommodated.

Manufacturability: Because the signal and power traces travel in only one direction, the disk backplane PCB can be modular and partitioned into four sets of two individual backplane PCBs. As a result there is an 80% reduction in the size of the PCB. Low cost connectors to join pairs of PCBs can be used, resulting in an 85% reduction in the cost of connectors in the backplane from the current system.

Thermal design: For the same 9 W hard drives, a 10° C. temperature rise from the ambient can be accomplished, resulting in high performance from newer high capacity hard drives. The additional space in the rack server chassis below the backplane PCBs can be used for increased airflow; airflow diverters in the space below the backplane PCBs can also be used to divert air into the cages that support the HDDs and towards other electrical components.

Vibration mitigation: As explained below, vibration mitigation features are added into the hard disk backplane PCBs due to the benign unidirectional electrical signal flow in the hard disk backplanes reducing vibration transfer. Vibration dampeners can be added to the space in the rack server chassis below the backplane PCBs, which is achieved through the increase in rack server height (the extra 1 RU can be used to accommodate vibration dampeners, in addition to airflow diverters).

Figure 1B:
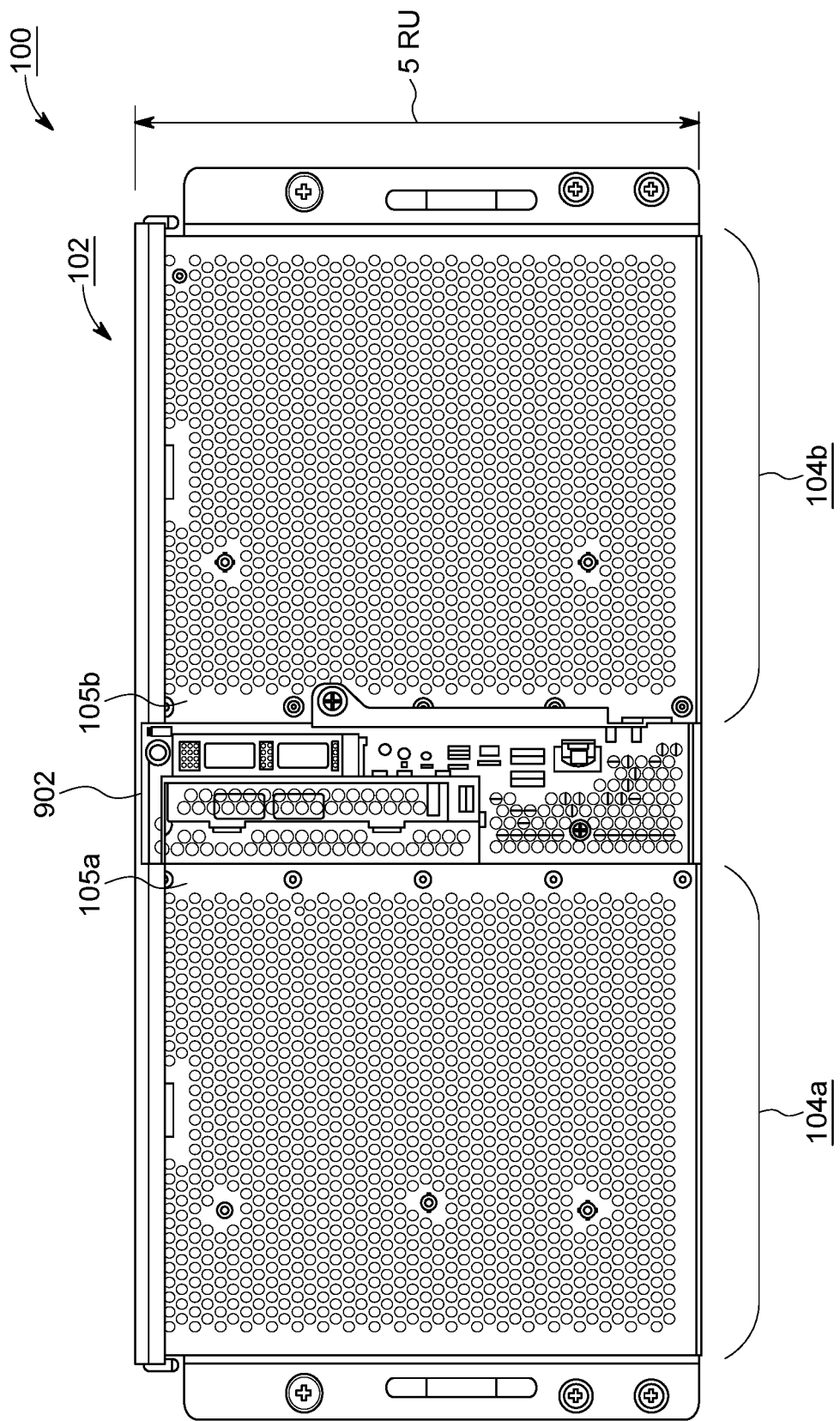
FIG. 1B is a schematic diagram of a front side of the example rack server of FIG. 1A in accordance with embodiments of the present disclosure.
Figure 1C:
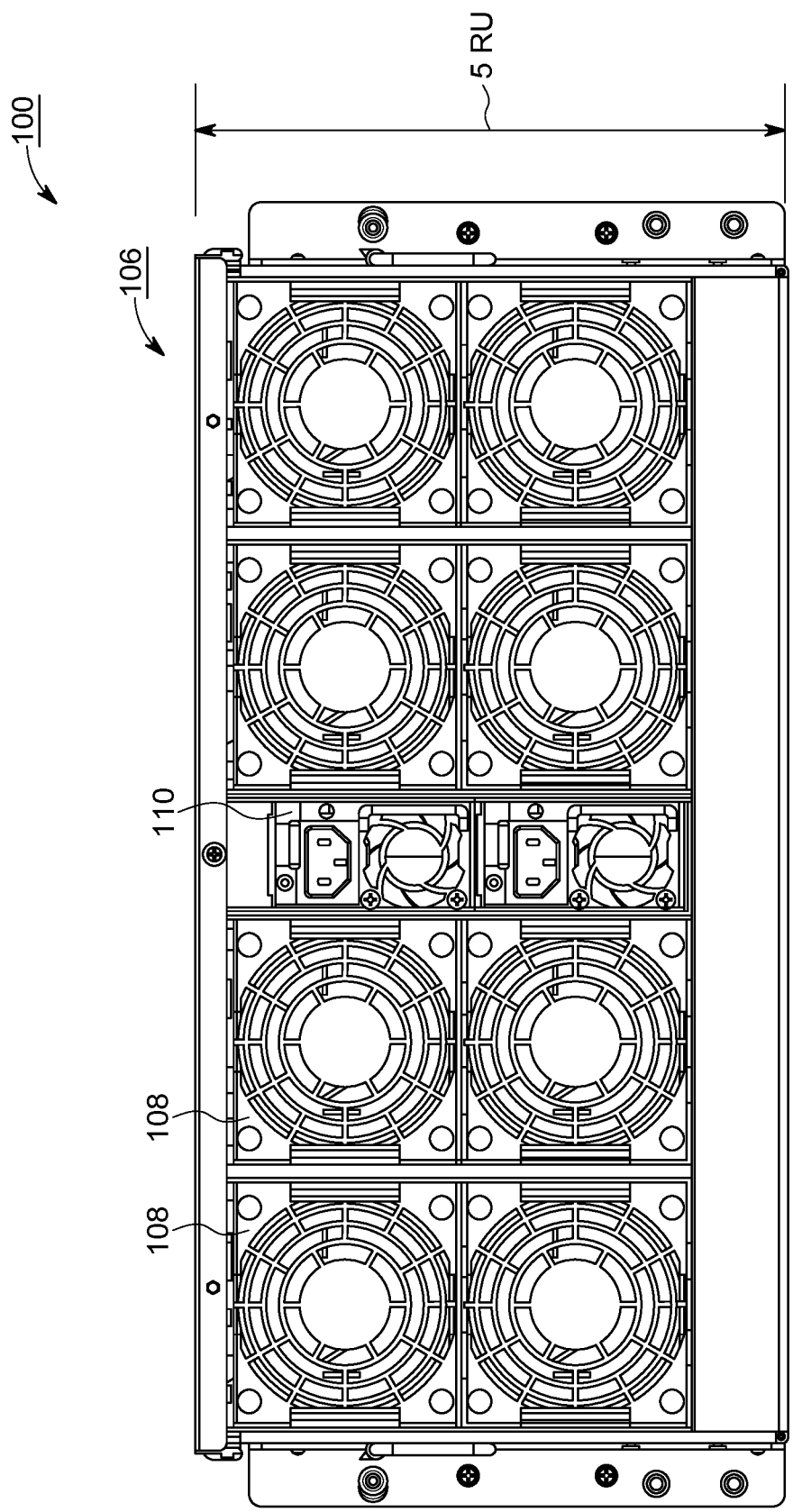
FIG. 1C is a schematic diagram of a rear side of the example rack server of FIG. 1A in accordance with embodiments of the present disclosure.
Figure 1D:
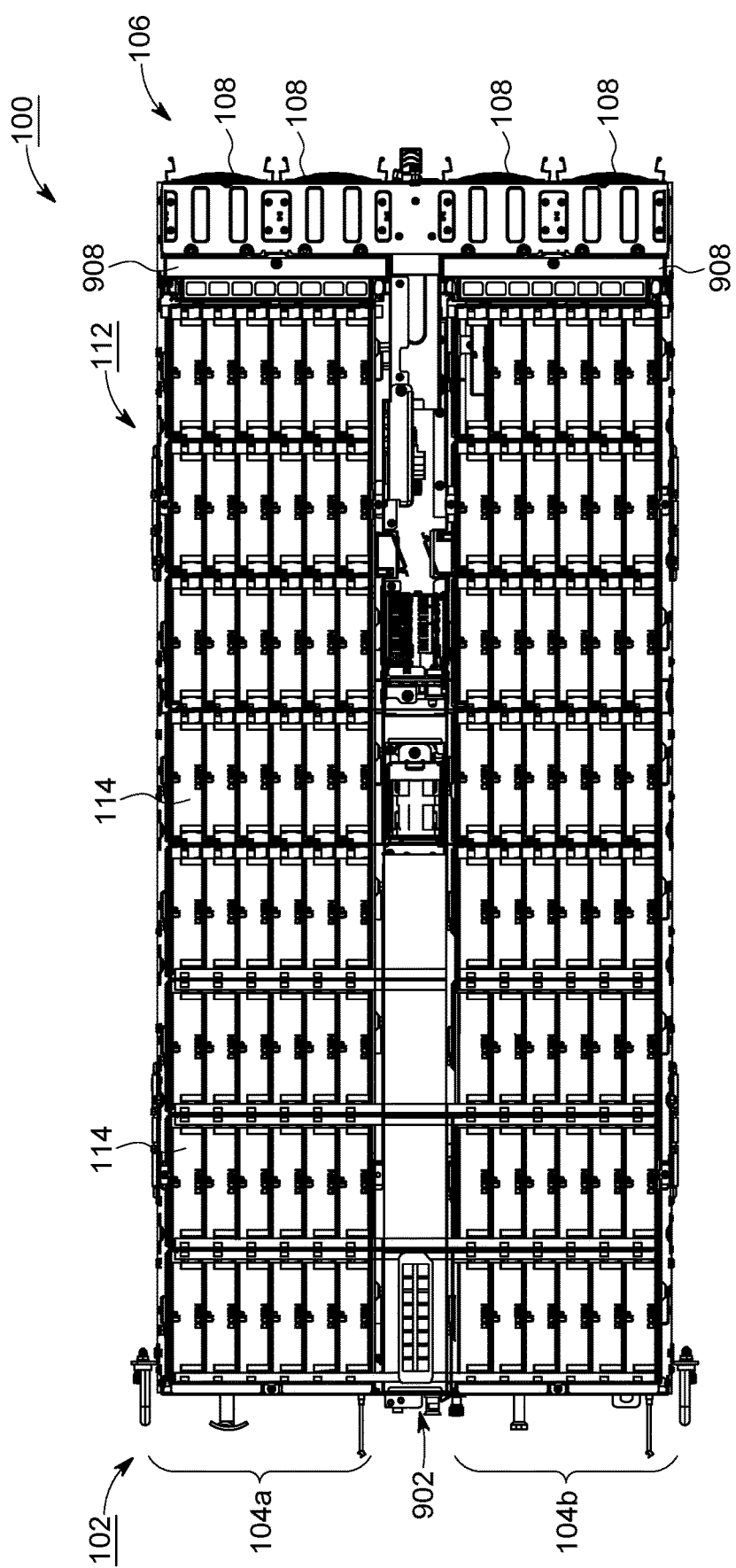
FIG. 1D is a schematic diagram of an open view of a top side of the example rack server of FIG. 1A showing a plurality of 3.5" hard disk drives in accordance with embodiments of the present disclosure.
Figure 1E:
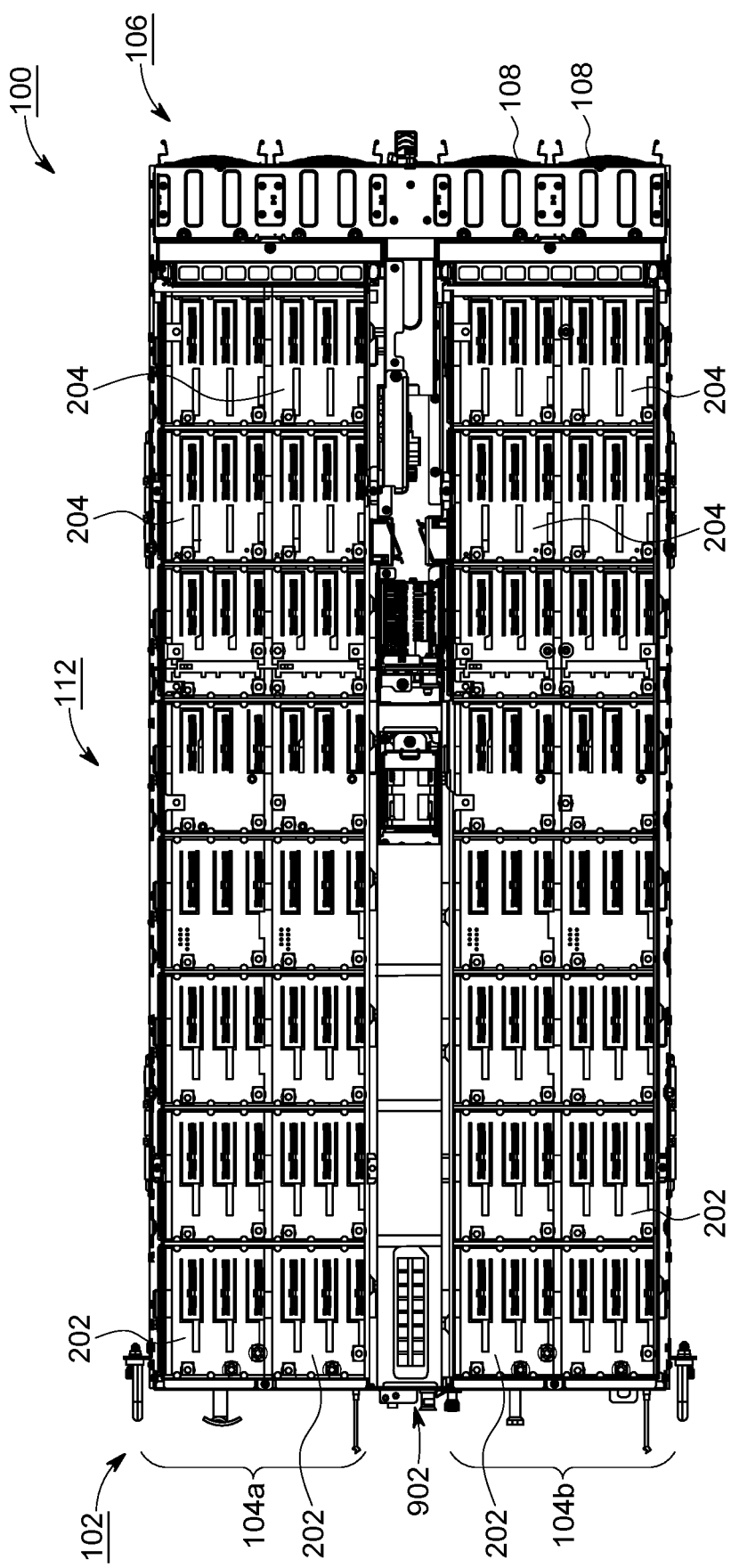
FIG. 1E is a schematic diagram of another open view of the top side of the example rack server of FIG. 1A showing a plurality of backplane printed circuit boards in accordance with embodiments of the present disclosure.
Figure 1F:
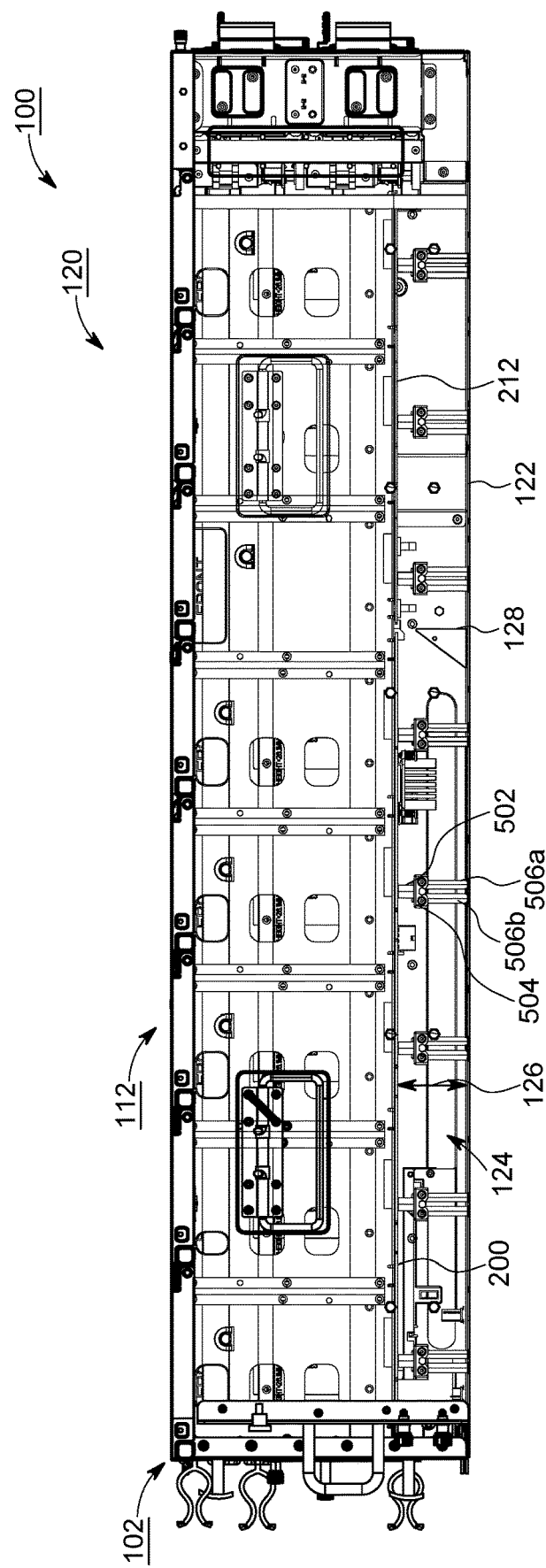
FIG. 1F is a schematic diagram of a semi-transparent view of a lateral side of the example rack server of FIG. 1A showing vibration dampening components in accordance with embodiments of the present disclosure.

The aforementioned structural and design features are discussed more detail in the text accompanying the figures described below:

FIG. 1A is a schematic diagram of an isometric view of an example rack server 100 in accordance with embodiments of the present disclosure. FIG. 1B is a schematic diagram of a front side 102 of the example rack server of FIG. 1A in accordance with embodiments of the present disclosure. FIG. 1C is a schematic diagram of a rear side 106 of the example rack server of FIG. 1A in accordance with embodiments of the present disclosure. FIG. 1D is a schematic diagram of an open, top view of the example rack server of FIG. 1A showing a plurality of 3.5" hard disk drives in accordance with embodiments of the present disclosure. FIG. 1E is a schematic diagram of an open, top view of the example rack server of FIG. 1A showing a plurality of backplane printed circuit boards in accordance with embodiments of the present disclosure. FIG. 1F is a schematic diagram of a semi-transparent view of a lateral side of the example rack server 100 of FIG. 1A showing vibration dampening components in accordance with embodiments of the present disclosure. FIGS. 1A-1F can be discussed together. The rack server 100 is shown to have a front side 102, a rear side 106, and a top side 112. As shown in FIG. 1A, the rack server 100 includes a 218.8 mm height, a 435 mm width, and a 1301.4 mm depth. The rack server 100 can include a chassis 101 that can house the various electrical and mechanical components for the rack server 100. In FIG. 1A, the rack server 100 is shown with a top cover 906. Some of these components are described in more detail in the text accompanying FIG. 9.

In FIG. 1B, the front side 102 of the rack server 100 is shown. The front side 102 includes two ventilated brackets 105a and 105b. A first bracket 105a can cover a first section 104a of the rack server; a second bracket 105b can cover a second section 104b of the rack server 100. Each section 104a and 104b, respectively, can house 48 3.5" hard disk drives (HDDs). The first and second brackets 105a, 105b, respectively, can be ventilated to allow for air to flow into each ventilated bracket 105a, 105b, through the chassis 101, and out of the rear side 106. In FIG. 1C, the rear side 106 of the rack server 100 is shown. The rear side 106 can include fans 108. The rack server 100 includes eight fans, four fans per section 104a, 104b. The fans 108 can pull air through the chassis 101 to cool various components housed in the chassis 101. The rear side 106 can also include a power supply unit (PSU) 110. The PSU can include components to receive power, convert power, and supply power to various electrical components in the rack server 100. The PSU 110 can couple to power deliver unit that is placed to minimize power delivery length to each HDD 114.

FIG. 1D shows a modified view of the top side 112 of the rack server 100. In the modified top view, the top cover 906 is not shown, and the HDDs 114 are shown. As shown, the rack server 100 includes two sections 104a and 104b, each section containing 48 HDDs 114. FIG. 1D also shows the node 902, fans 108, fan modules 908, and other electrical components. FIG. 1E shows another modified view of the top side 112. In FIG. 1E, the HDDs 114 are not shown. Instead, the first and second backplane PCBs 202 and 204 are shown. The first and second backplane PCBs 202 and 204 are described in more detail below. First section 104a includes two sets of backplane PCBs: each set of backplane PCBs including a first backplane PCB 202 and a second backplane PCB 204. Second section 104b also includes two sets of backplane PCBs. Each set of backplane PCBs can support 24 HDDs 114, each section 104a and 104b can include 48 HDDs 114, and the rack server 100 includes a total of 96 HDDs 114.

FIG. 1F shows a semi-transparent view of a lateral side 120 of the rack server 100. FIG. 1F also shows the bottom side 122 of the chassis 101 of rack server 100. FIG. 1F illustrates a space 124 between the PCBs 200 and the bottom of the chassis 101. The space 124 can be defined by a distance 126 from the bottom of the PCBs 200 to the bottom of the chassis 101. The distance 126 can be approximately 1 RU or slightly less than 1 RU. The bottom of the chassis 101 can include an airflow diverter 128 that can have a shape to divert airflow in the space 124 from the front side 102 into the cages 904a, 904b holding the HDDs 114. This way, the HDDs 114 near the rear side 106 of the rack server 100 can receive cool air.

Also shown in FIG. 1F is vibration dampener 502. Vibration dampener 502 is supported by a support rail 504 that is offset from the bottom 122 of the chassis 101 by support beams 506a and 506b. The vibration dampener 502 is described in more detail later.

Figure 2A:
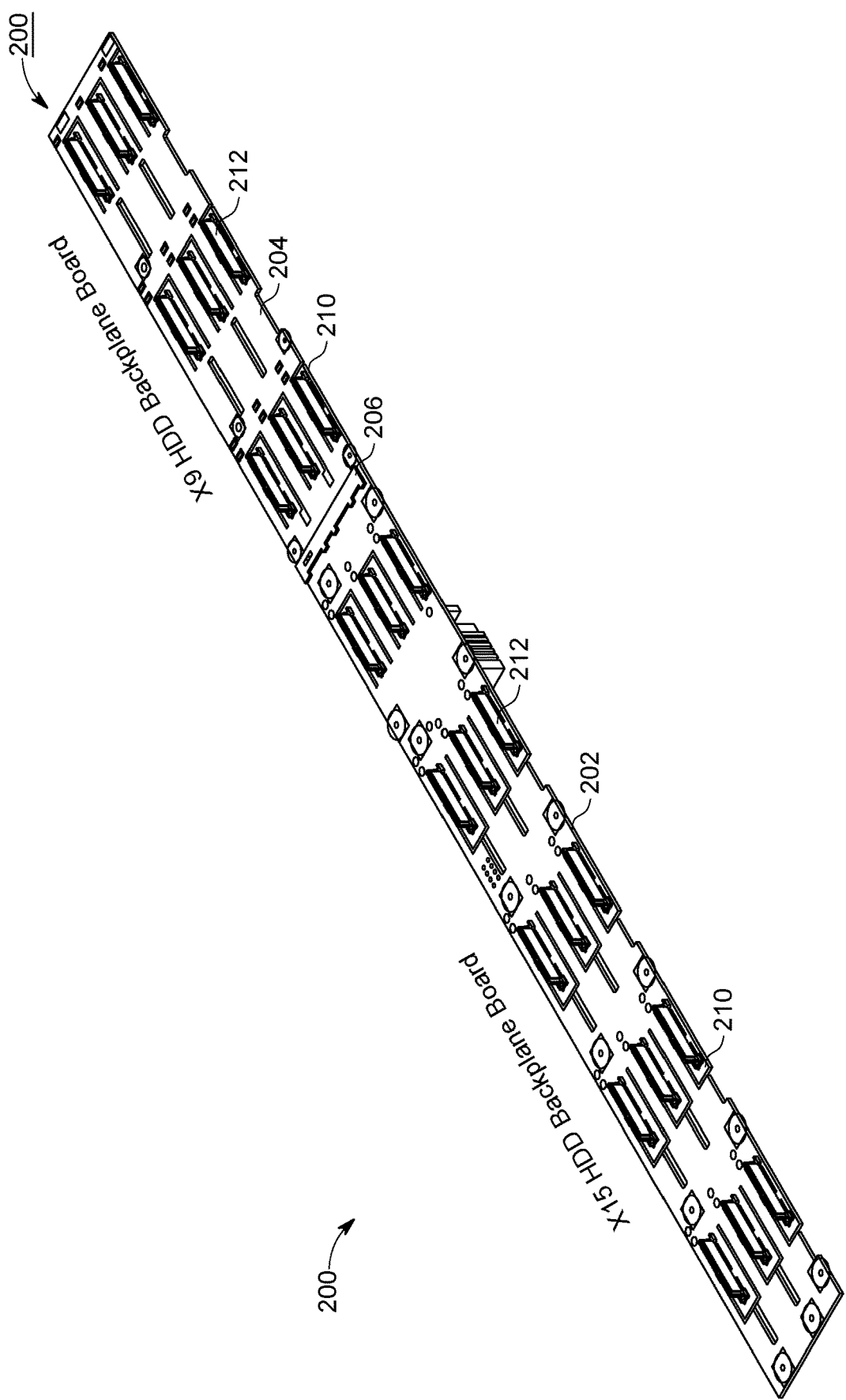
FIG. 2A is a schematic diagram of an isometric view of two backplane printed circuit boards coupled together in accordance with embodiments of the present disclosure.

FIG. 2A is a schematic diagram of an isometric view of a modular backplane printed circuit board 200 that includes two backplane printed circuit boards coupled together in accordance with embodiments of the present disclosure. The module backplane printed circuit board (PCB) 200 can include a first PCB 202 coupled to a second PCB 204 by a connector 206. The first PCB can include a plurality of cantilevered beams 210 (here, first PCB 202 includes fifteen cantilevered beams 210). The second PCB 204 can include a plurality of cantilevered beams 210 (here, second PCB 204 includes nine cantilevered beams 210). Each cantilevered beam 210 can support a receiver slot connector 212 to receive a HDD 114.

Figure 2B:
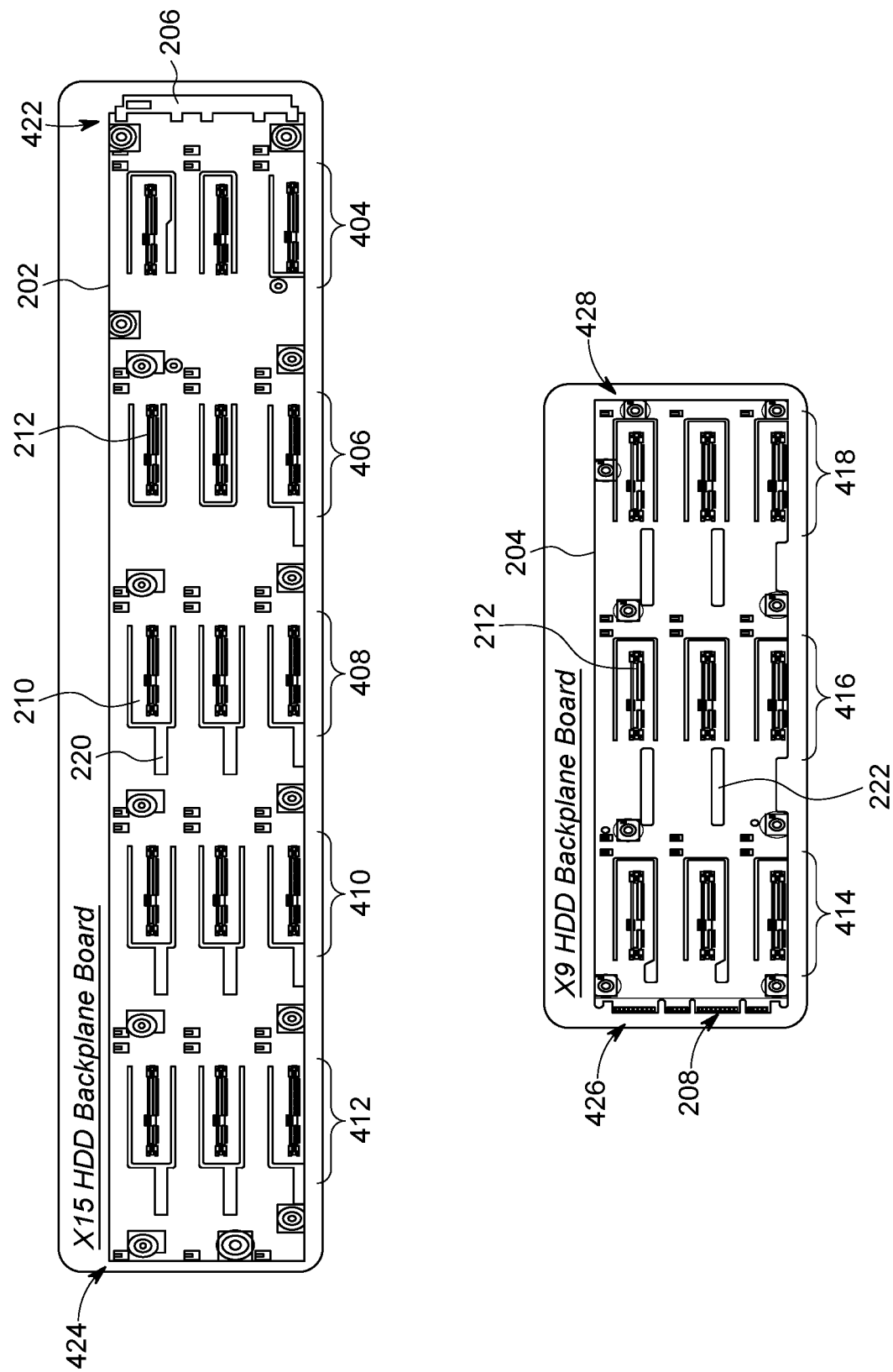
FIG. 2B is a schematic diagram of a top view of the two backplane printed circuit boards of FIG. 2A uncoupled from each other in accordance with embodiments of the present disclosure.

FIG. 2B is a schematic diagram of a top view of the two backplane printed circuit boards of FIG. 2A uncoupled from each other in accordance with embodiments of the present disclosure. FIG. 2B illustrates the plurality of cantilevered beams 210 in each of the first PCB 202 and the second PCB 204. Turning first to the first PCB 202: first PCB 202 includes a connector side 422 that includes a connector 206. Connector 206 is shown to be an edge connector socket receiver, but it is understood that other types of connector styles can be used without deviating from the scope of this disclosure. The first PCB 202 also includes a distal side 424 opposite the connector side 422. Between the connector side 422 and the distal side 424 are the plurality of cantilevered beams 210. The first PCB 202 can include five sets of three cantilevered beams: a first set 404, second set 406, third set 408, fourth set 410, and fifth set 412. The first set 404 resides adjacent to the connector side 422. Between the first set 404 and the second set 406, a portion of the first PCB 202 is reserved for a serial attached small computer serial interface (SAS) expander circuit (not shown). Also shown in FIG. 2B are notches 220 formed in the first backplane PCB 202. The notches 220 can aid in thermal control, vibration isolation and mitigation, as well as in manufacturability of the cantilevered beams 210.

The second PCB 204 includes an edge connector side 426 that includes an edge connector 208 that can mate with the edge connector socket receiver 206. As an example, the edge connector 208 can include a plurality of gold fingers that can conduct electricity by making ohmic contact with corresponding conductors in the edge connector socket receiver 206. The second PCB 204 also includes a plurality of cantilevered beams 210. A first set 414 of cantilevered beams 210 resides adjacent to the edge connector 208 on the edge connector side 426 of the second PCB 204. A second set 416 of cantilevered beams 210 resides adjacent the first set 414. And a third set 418 of cantilevered beams 210 resides adjacent the second set 416 and adjacent a distal end 428 of the second PCB 204. Notches 222 are formed in the second PCB 204 for airflow and for vibration management.

Figure 3A:
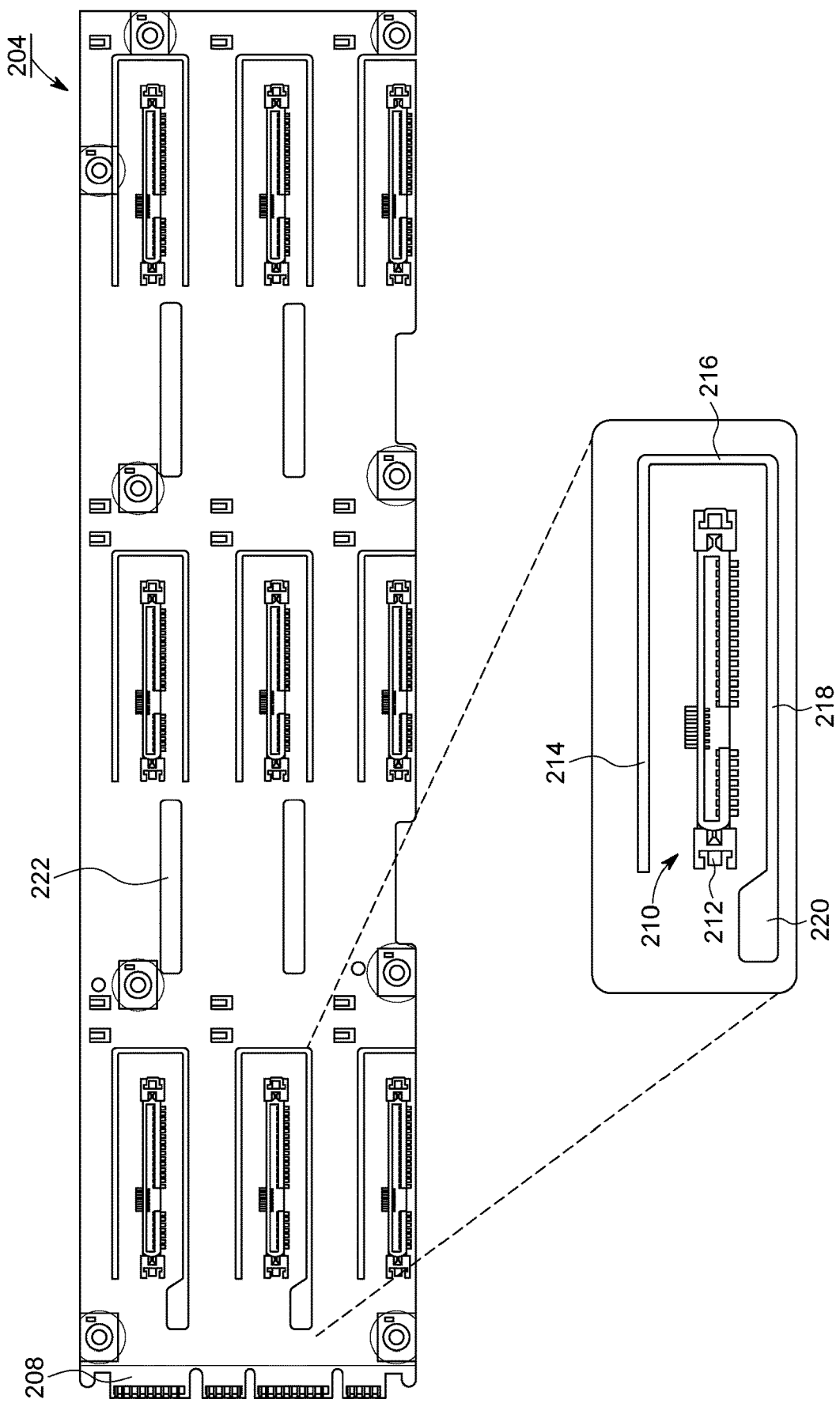
FIGS. 3A-3B are schematic diagrams of top views of an example backplane printed circuit board showing two examples of a cantilevered beam and receiver slot for a 3.5" hard disk drive in accordance with embodiments of the present disclosure.
Figure 3B:
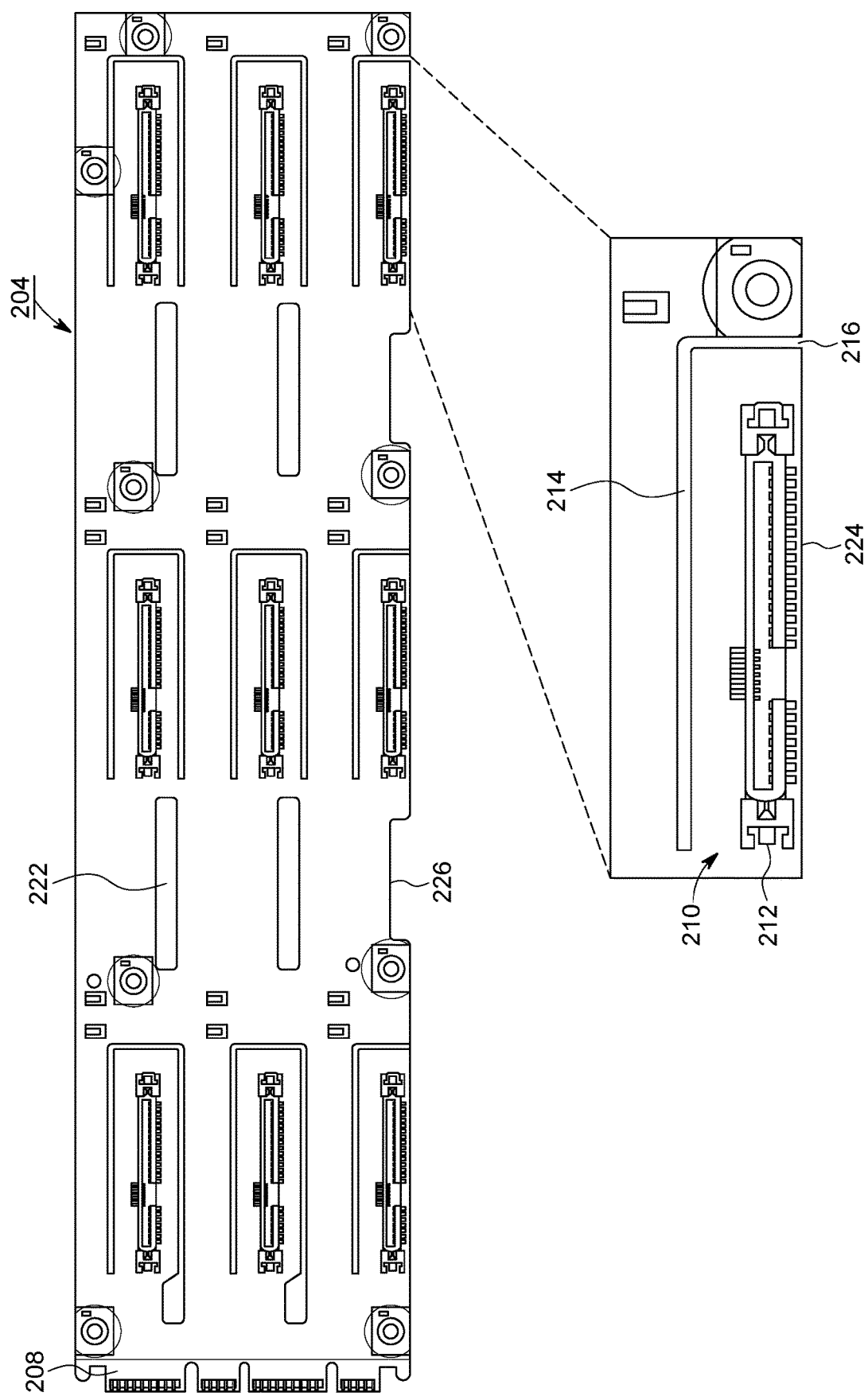

FIGS. 3A-3B are schematic diagrams of top views of an example backplane printed circuit board showing two examples of a cantilevered beam and receiver slot for a 3.5" hard disk drive in accordance with embodiments of the present disclosure. The example backplane PCB shown in FIGS. 3A-3B is a second PCB 204, but first PCB 202 follows a similar description. FIGS. 3A-3B also show close-up views of the cantilevered beam 210. The second PCB 204 is shown to include notches 222. Notches 222 can be formed during PCB processing or manufacturing using known techniques. The notches 222 are formed at predetermined locations selected to ensure both vibration mitigation and isolation, as well as for allowing airflow to enter the cages 904a,b holding the HDDs 114 from the space 124 beneath the backplane PCB 200 for cooling purposes.

The cantilevered beam 210 is shown in FIGS. 3A-3B. In FIG. 3A, the cantilevered beam 210 is positioned in the middle of the second PCB 204, and is formed by removing PCB material from three sides of the connector 212; in FIG. 3B, the cantilevered beam 210 is positioned at the edge of the second PCB 204, and can be formed by removing PCB material from two sides of the connector 212. The HDD connector 212 is the primary mechanical connection of the HDD 114 to the backplane PCB 200. The cantilevered beam 210 can hold a connector 212, and the PCB material around the location where each connector 212 would be located is removed on two or three sides. The removal of the PCB material serves to isolate the HDD 114 from the PCB on three sides. Put differently, each cantilevered beam 210 is suspended in air by the PCB on one side. The PCB is removed in such a way as to allow traces from the SAS expander to travel unidirectionally along the long axis of the backplane PCB 200.

As will be shown later, vibration dampeners 502 are positioned beneath each connector for mechanical support and further vibration dampening. By removing the PCB material, the cantilevered beam 210 can be fragile, particularly when an HDD 114 is coupled to it; thus, the cantilevered beam 210 is supported by a vibration dampener 502, which provides both mechanical support for the cantilevered beam 210 to hold the HDD 114 and for vibration dampening.

In FIG. 3A, the detailed view of the cantilevered beam 210 shows PCB removed from three sides of the connector 212: PCB material is removed from a first lateral side 214, a distal side 216, and a second lateral side 218. An additional notch 220 is shown to extend from the second lateral side 218 slightly behind the connector 212, for added vibration management and added airflow. In FIG. 3B, the detailed view of the cantilevered beam 210 shows PCB material removed from the first lateral side 214 and from the distal side 216, but since this cantilevered beam 210 resides at the edge 224 of the second PCB 204, the empty space isolates the cantilevered beam 210 from vibrations. Notches 226 can also be formed at the edge 224 for airflow and vibration management.

Figure 4:
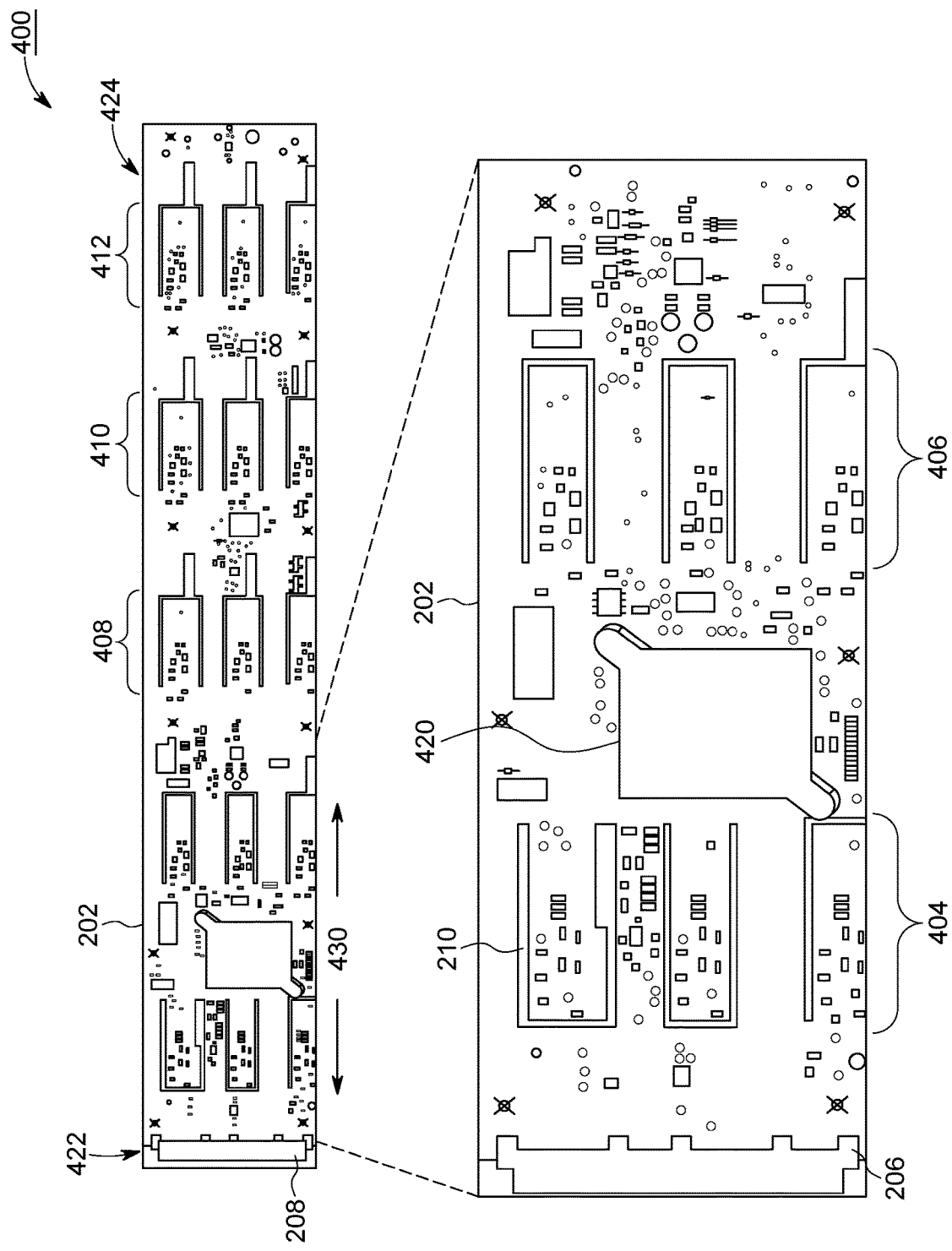
FIG. 4 is a schematic diagram of a top view of an example backplane printed circuit board showing a receiver for an expander circuit in accordance with embodiments of the present disclosure.

FIG. 4 is a schematic diagram 400 of a top view of an example first backplane printed circuit board 202 showing a receiver 420 for an expander circuit in accordance with embodiments of the present disclosure. While the expander circuit is not shown, the receiver 420 is a location on the first PCB 202 where the expander circuit would be located. In the rack server 100, multiple expander circuits are used: one for each set of backplane PCBs 200 (the rack server 100 includes four sets of backplane PCBs 200). A close-up view of the first PCB 202 is shown. In the close-up view, the receiver 420 is shown to reside between the first set 404 and the second set 406 of cantilevered beams. The positioning of the expander circuit closer to the connector side 422 facilitates the one-dimensionality of the traces 430 connecting the expander circuit to the connectors 212. The modular design of the backplane PCB 200 and the largely one-dimensionality of the trace pattern allows for notches 220, 222, 226 to be formed in the first and second backplane PCBs 202, 204, which are used for thermal management, vibrational management, and manufacturability. Noteworthy is that the cantilevered beams 210 can be formed such that traces can connect the connectors 212 to the expander circuit, while also providing the vibrational isolation. As an example, first set 404 includes cantilevered beams 210 that point in a different direction than cantilevered beams 210 in the second set 406.

Figure 5A:
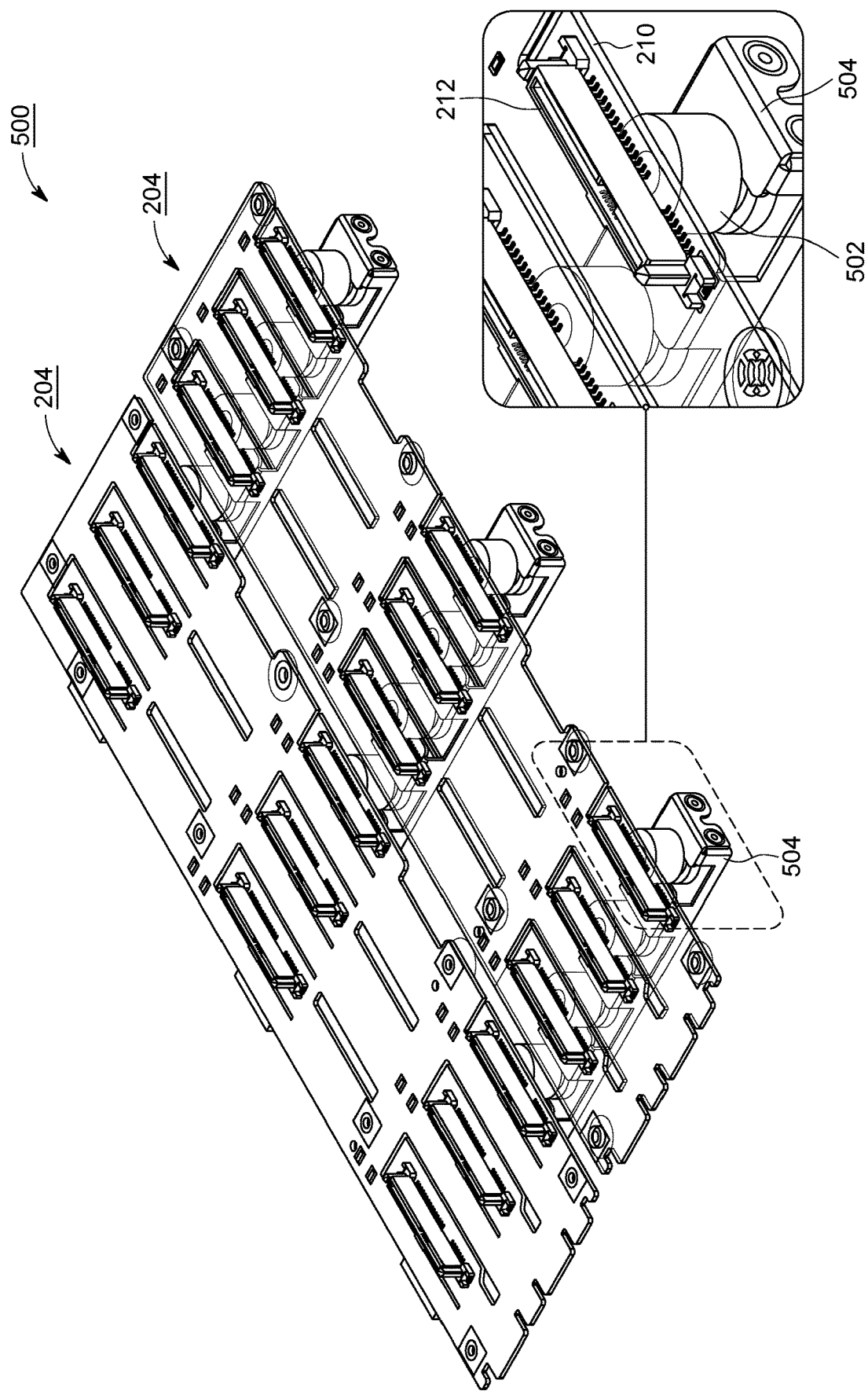
FIG. 5A is a schematic diagram of an isometric view of an example backplane printed circuit board showing vibration dampening elements in accordance with embodiments of the present disclosure.
Figure 5B:
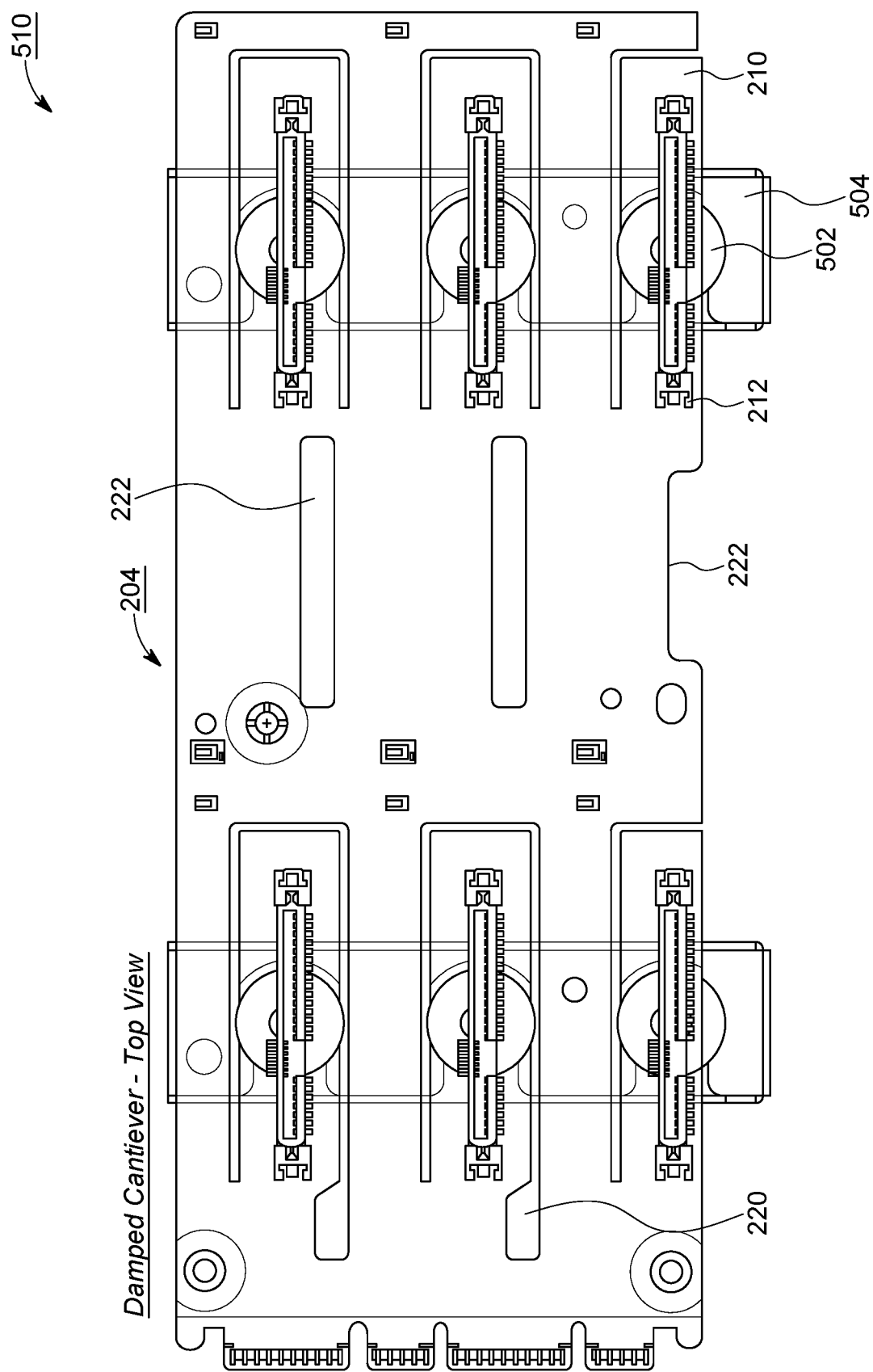
FIG. 5B is a schematic diagram of a semi-transparent, top view of the example backplane printed circuit board of FIG. 5A showing vibration dampening elements in accordance with embodiments of the present disclosure.
Figure 5C:
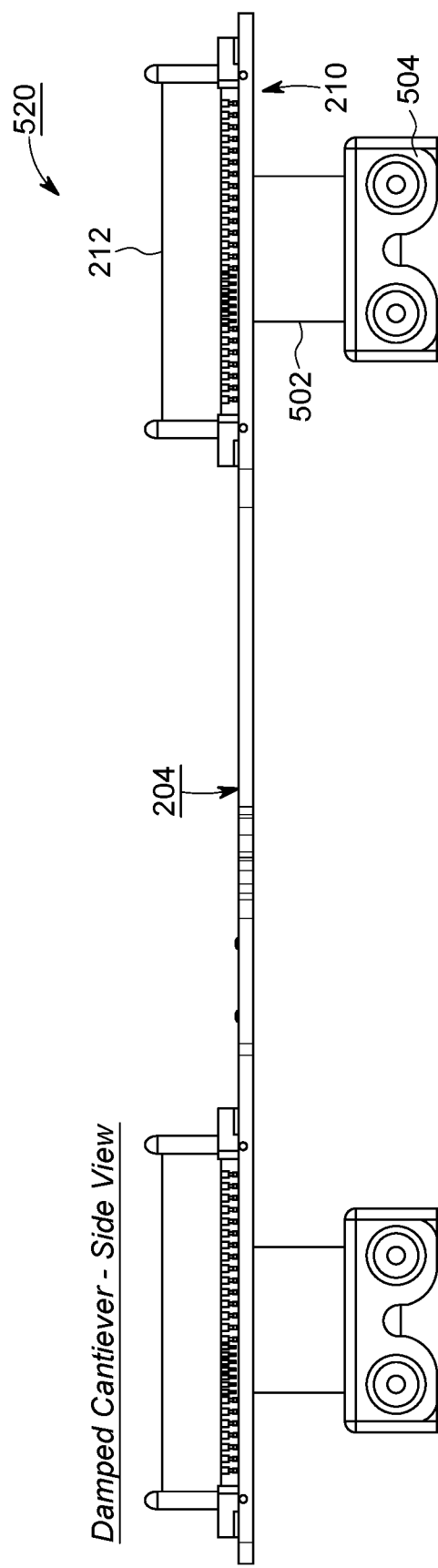
FIG. 5C is a schematic diagram of a side view of the example backplane printed circuit board of FIG. 5A showing vibration dampening elements in accordance with embodiments of the present disclosure.

FIG. 5A is a schematic diagram 500 of an isometric view of an example backplane printed circuit board showing vibration dampening elements in accordance with embodiments of the present disclosure. FIG. 5B is a schematic diagram 510 of a semi-transparent, top view of the example backplane printed circuit board of FIG. 5A showing vibration dampening elements in accordance with embodiments of the present disclosure. FIG. 5C is a schematic diagram 520 of a side view of the example backplane printed circuit board of FIG. 5A showing vibration dampening elements in accordance with embodiments of the present disclosure. FIGS. 5A-5C all show the vibration dampener 502 residing beneath the connector 212 on cantilever beam 210. A vibration dampener 502 can reside beneath each cantilevered beam 210 in the rack server 100. The vibration dampener 502 is in mechanical contact with the cantilevered beam 210. In embodiments, the vibration dampener 502 can contact the cantilevered beam 210 when the HDD 114 coupled to the connector 212; or the vibration dampener 502 can contact the cantilevered beam 210 even without the HDD 114 connected to the connector 212.

The vibration dampener 502 can be a elastomer grommet or other material and structure that can provide structural support for the cantilevered beam 210. As mentioned before, the cantilevered beam 210 can be fragile, and can break when the HDD 114 is coupled to it by the weight of the HDD 114. The vibration dampener 502 provides structural support for the cantilevered beam 210. In addition, the vibration dampener 502 can also provide vibration mitigation for the HDD 114 (as shown in FIG. 7).

The vibration dampeners 502 are secured in place by a support rail 504. The support rail 504 can carry a plurality of vibration dampeners 502 for one or more sets of cantilevered beams 210 and one or more sets of backplane PCBs 200. The support rail 504 is coupled to the chassis 101 by support beams 506a, 506b (shown in FIGS. 6A-6B).

Figure 6A:
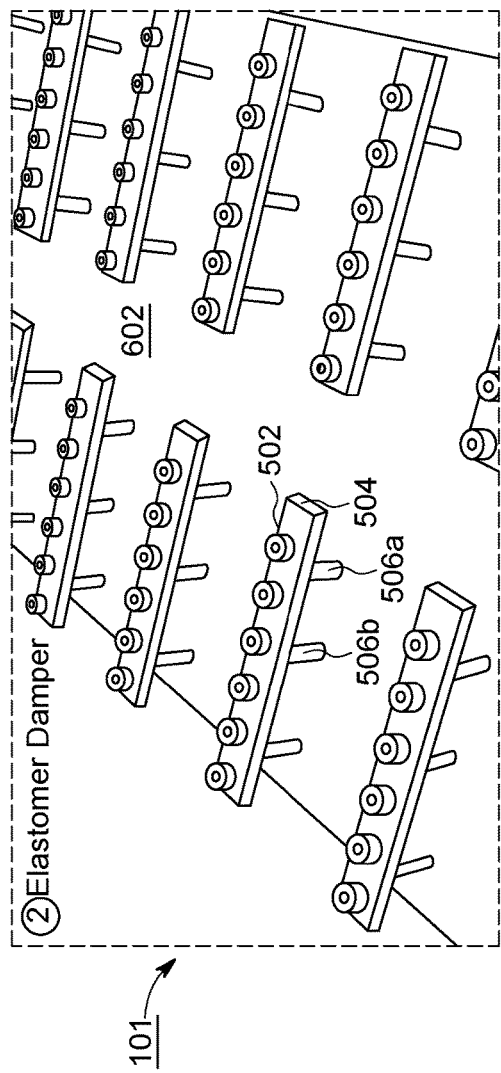
FIGS. 6A-6B are schematic diagrams of isometric views of a chassis of a rack server of FIGS. 1A-F showing vibration dampening elements secured to the chassis in accordance with embodiments of the present disclosure.
Figure 6B:
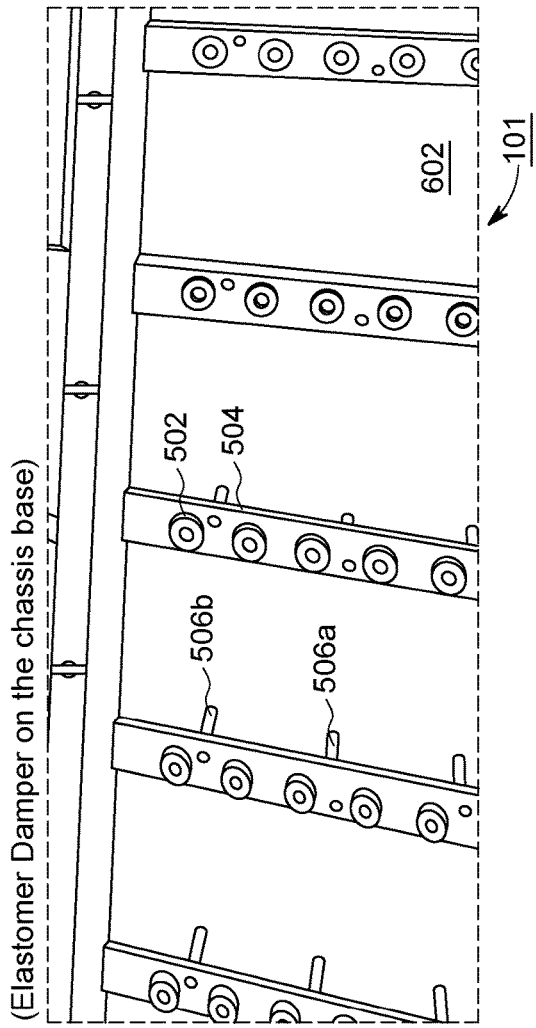

FIGS. 6A-6B are schematic diagrams of isometric views of a chassis of a rack server of FIGS. 1A-F showing vibration dampening elements secured to the chassis in accordance with embodiments of the present disclosure. As shown in FIGS. 6A-6B, each side of the rack server 100 includes a plurality of vibration dampeners 502. The vibration dampeners 502 are supported by a support rail 504 that is secured to the bottom surface 602 of chassis 101 by support beams 506a and 506b. There is one vibration dampener 502 per cantilevered beam 210.

Figure 7:
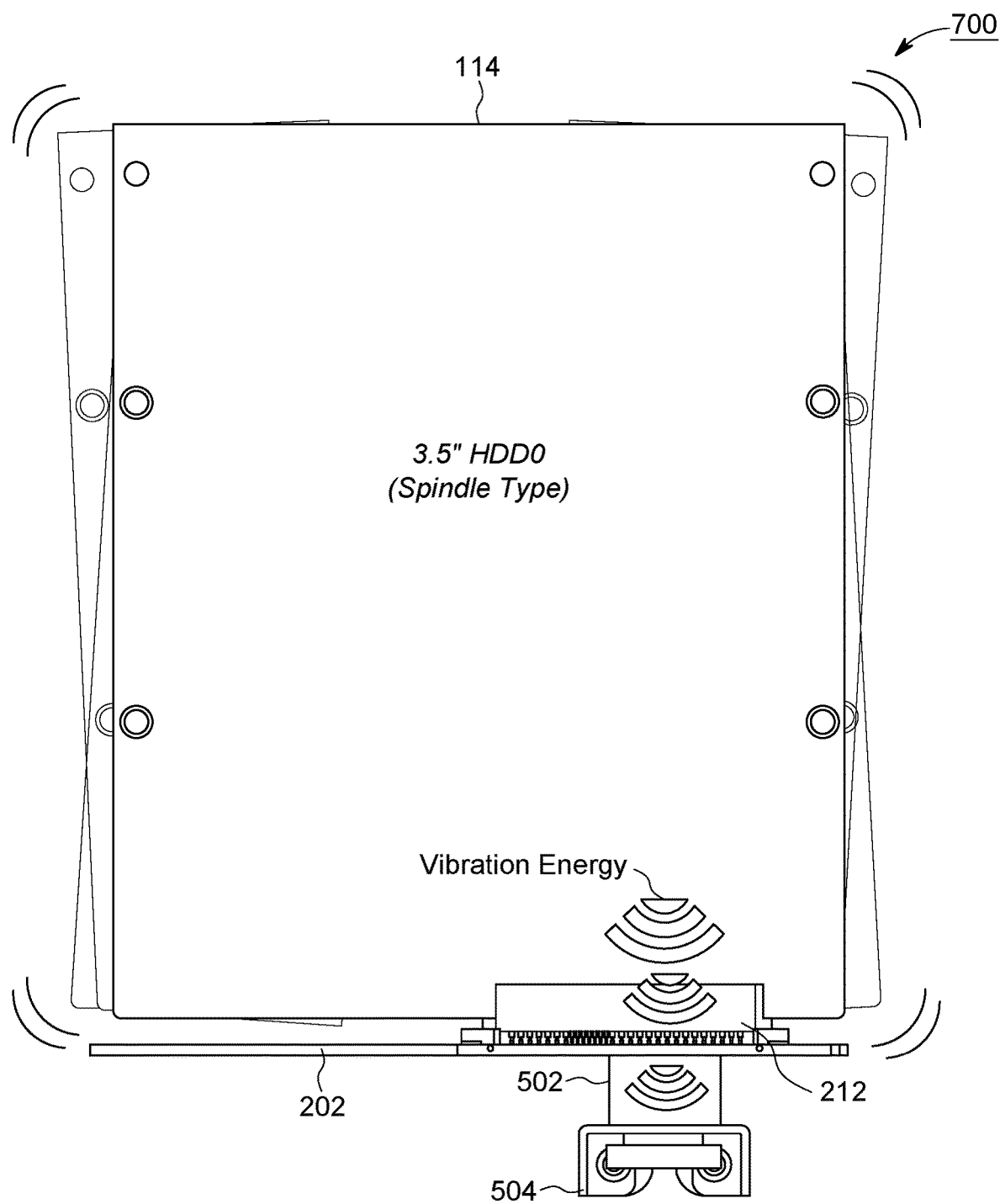
FIG. 7 is a schematic diagram of a schematic diagram of a side view of an example backplane printed circuit board with a vibration dampening element supporting a 3.5" hard disk drive in accordance with embodiments of the present disclosure.

FIG. 7 is a schematic diagram 700 of a schematic diagram of a side view of an example first backplane printed circuit board 202 with a vibration dampening element 502 supporting a 3.5" hard disk drive 114 in accordance with embodiments of the present disclosure. During operation, the HDD 114 can be the source of mechanical vibrations that travel through the connector and into the PCB. The vibrations from one HDD 114 can affect the performance of other HDDs, and of course, all of the HDDs can vibrate. Vibrational energy from the HDD 114 can be partially isolated from the rest of the PCB by the cantilevered beams and notches formed in the PCB. In addition, vibrational energy can be damped by dampener 502. The dampener 502 can essentially absorb at least some of the vibrational energy from the HDD, thereby minimizing the amount of vibration that permeates through the PCB towards other areas.

Figure 8A:
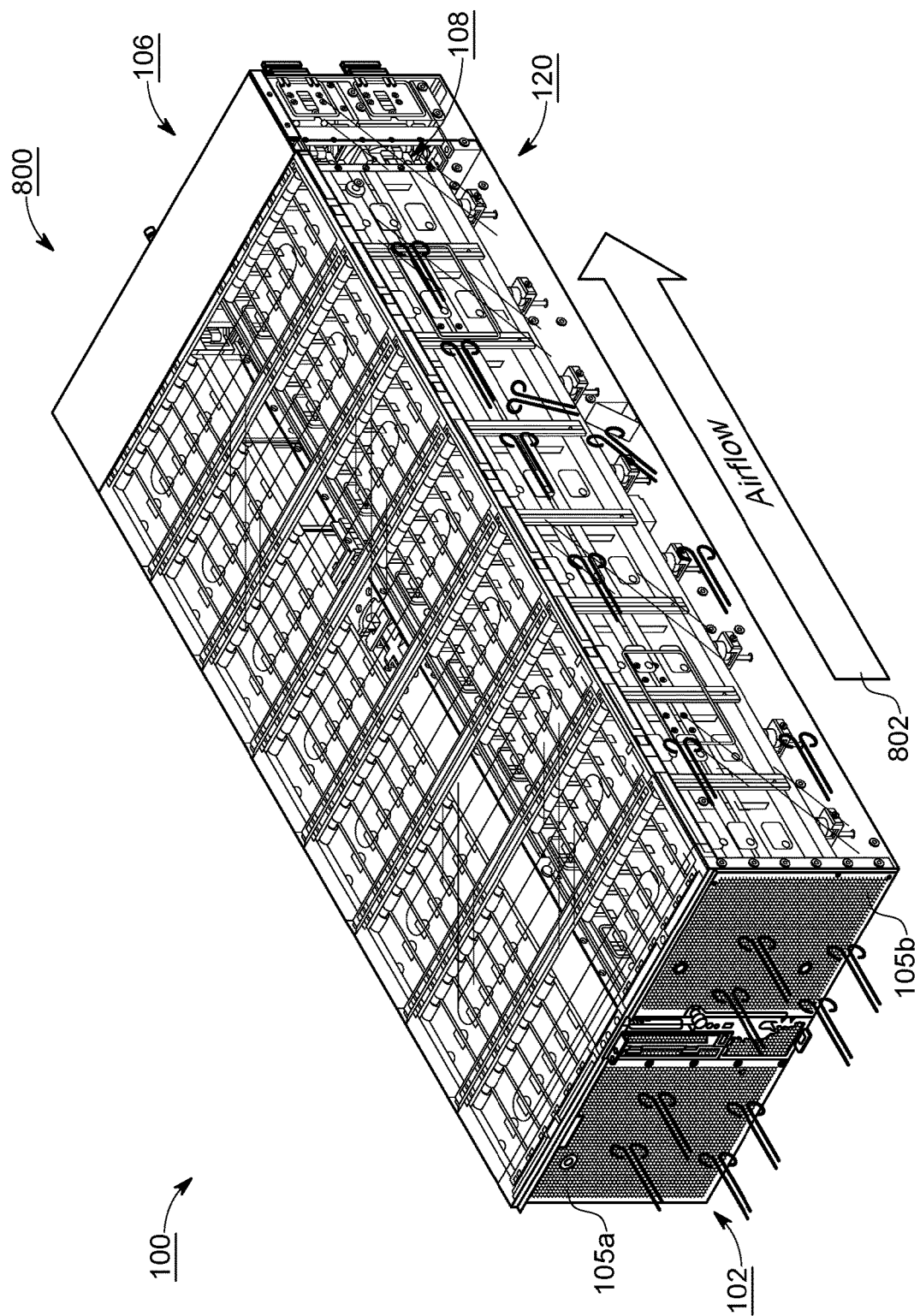
FIG. 8A is a schematic diagram of an semi-transparent, isometric view of the rack server of FIGS. 1A-F showing airflow patterns in accordance with embodiments of the present disclosure.
Figure 8B:
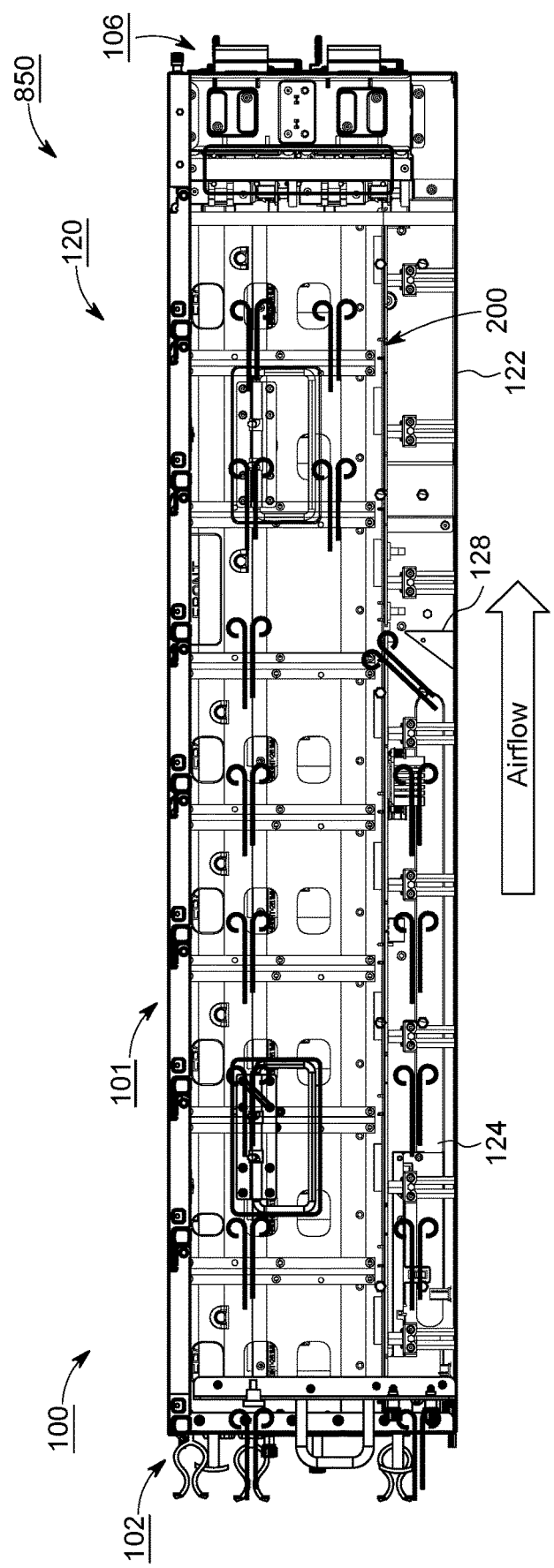
FIG. 8B is a schematic diagram of a semi-transparent, side view of the rack server of FIGS. 1A-F showing airflow patterns in accordance with embodiments of the present disclosure.

FIG. 8A is a schematic diagram 800 of an semi-transparent, isometric view of the rack server of FIGS. 1A-F showing airflow patterns in accordance with embodiments of the present disclosure. FIG. 8B is a schematic diagram 850 of a semi-transparent, side view of the rack server of FIGS. 1A-F showing airflow patterns 802 in accordance with embodiments of the present disclosure. Fans 108 can pull air through the ventilated brackets 105a, 105b. Air flows into the cages 904a, 904b, thereby cooling HDDs 114 near the front side 102. The HDDs 114 near the front side 102 can heat up the air and can block airflow, so that HDDs 114 near the rear side 106 might not get sufficient airflow for cooling and maintaining ideal performance temperatures (e.g., less than or equal to 10° C. above ambient). By increasing the height of the rack server 100 to 5 RU, extra space 124 now exists below the backplane PCB 200. Air also flows in the space 124 beneath backplane PCB 200 due to the fans 108 pulling air. Airflow diverters, such as diverter 128 can reside in the space 124 affixed to the bottom 122 of chassis 101. The diverter 128 can divert airflow moving from the front side 102 towards the rear side 106 in the space 124 to enter the cages 904a, 904b to cool the HDDs 114 closer to the rear side 106 of the rack server 100. This additional airflow can help cool the HDDs 114 near the rear side 106 of the rack server 100 to maintain performance within specifications. The air can pass through the backplane PCB 200 through the various notches 220, 222, and 226.

Figure 9:
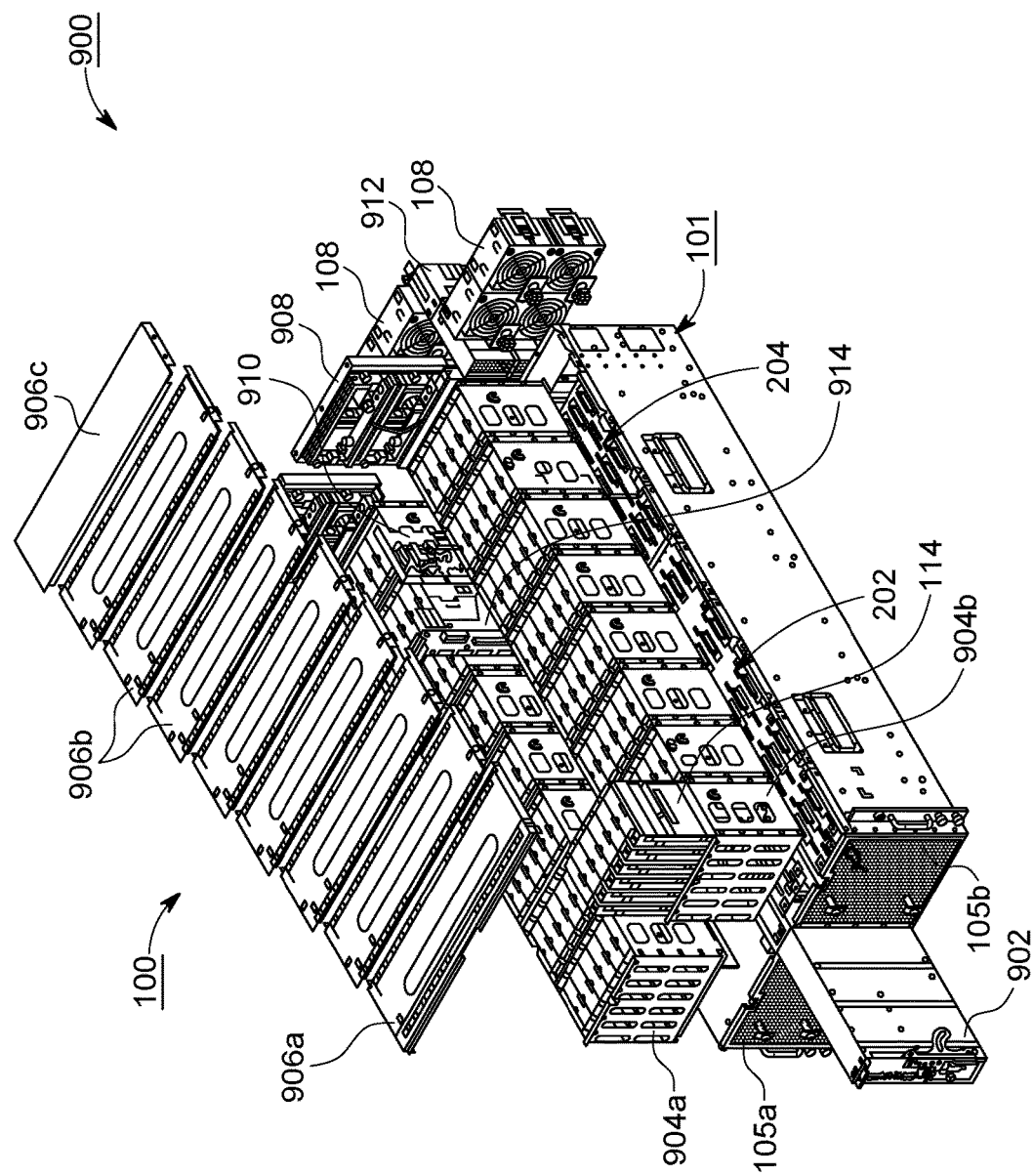
FIG. 9 is a schematic diagram of an exploded isometric view of the rack server of FIGS. 1A-F showing various components in accordance with embodiments of the present disclosure.

FIG. 9 is a schematic diagram of an exploded isometric view 900 of the rack server 100 of FIGS. 1A-F showing various components in accordance with embodiments of the present disclosure. Generally, the rack server 100 can include other circuit elements, boards, units, modules, etc. to operate as a storage server. The rack server 100 can include a chassis 101. Chassis 101 can be made of a steel or aluminum or other rigid material. The chassis 101 can act as a faraday cage to block electromagnetic emissions. The chassis 101 can securely house various components of the rack server, including electronic components, printed circuit boards, vibration dampening, air flow components, etc., some of which are described below.

The chassis 101 can securely house a node module 902. Node module 902 can be equipped with a motherboard card, an interconnect link module (e.g., U.2 module for solid state drives), a fan module (e.g., a 4056 fan module), and a network interface card (NIC, such as an open compute project (OCP) 3.0 card).

The rack server 100 includes two HDD cages: HDD cage 904a and HDD cage 904b. HDD cage 904a includes a ventilated front bracket 105a; and HDD cage 904b includes a ventilated front bracket 105b. The chassis 101 can secure a plurality of backplane PCBs, such as first backplane PCB 202 and second backplane PCB 204. As described earlier, the chassis 101 can hold four first backplane PCBs 202 and four second backplane PCBs 204, where each first backplane PCB 202 is electrically and physically connected to a corresponding second backplane PCB 204. HDD cards 114 are electrically and mechanically connected to the first and second backplane PCBs 202, 204. The HDD cages 904a, 904b can secure HDD cards 114 and also add some EMI protection. In embodiments of the present disclosure, the rack server 100 has a 5 RU vertical height. The 5 RU form factor permits the chassis 101 to hold 96 3.5" HDD cards 114 within cages 904a, 904b, while also having space underneath the first and second backplane PCBs 202, 204 for airflow from the front of the chassis 101 to the rear of the chassis 101. As shown earlier, the chassis 101 can also include airflow diverters to divert air from the bottom of the chassis 101 into the HDD cages 904a, 904b to cool the HDDs 114.

The rack server 100 can include a top cover. In embodiments, the top cover is segmented. For example, top cover can include a front top cover 906a, a rear top cover 906c, and a plurality of central top covers 906b between the front top cover 906a and the rear top cover 906c.

The rack server 100 can include a fan module 908. Fan module 908 can include circuitry for controlling and powering fans 108. Implementations of the rack server 100 can include eight fans 108, and each fan module 908 can support four fans. Thus, implementations of the rack server 100 can include two fan modules. Fans 108 can cause airflow through the chassis 101 to cool the various electronic components. The air can travel generally from the front of the chassis 101 to the rear towards the fans 108. Flow diverter(s) on the bottom of the chassis 101 can direct airflow into the cages 904a, 904b.

The rack server 100 can include a power distribution module 910. Power distribution module 910 can include a power distribution circuit board (PDB) that can receive power from a power supply (such as power supplies 912) and distribute power to various electrical components, including the 3.5" HDDs 114, the fans 108, and the node module 902.

The rack server 100 can include a host bus adapter (HBA) module 914. The HBA module 914 can include an HBA circuit board. The HBA module 914 can connect a host system, such as a server, to a storage or network device. An HBA module 914 also provides input/output (I/O) processing to reduce the load on the host's microprocessor when storing and retrieving data, helping to improve the host's overall performance.

Figure 10:
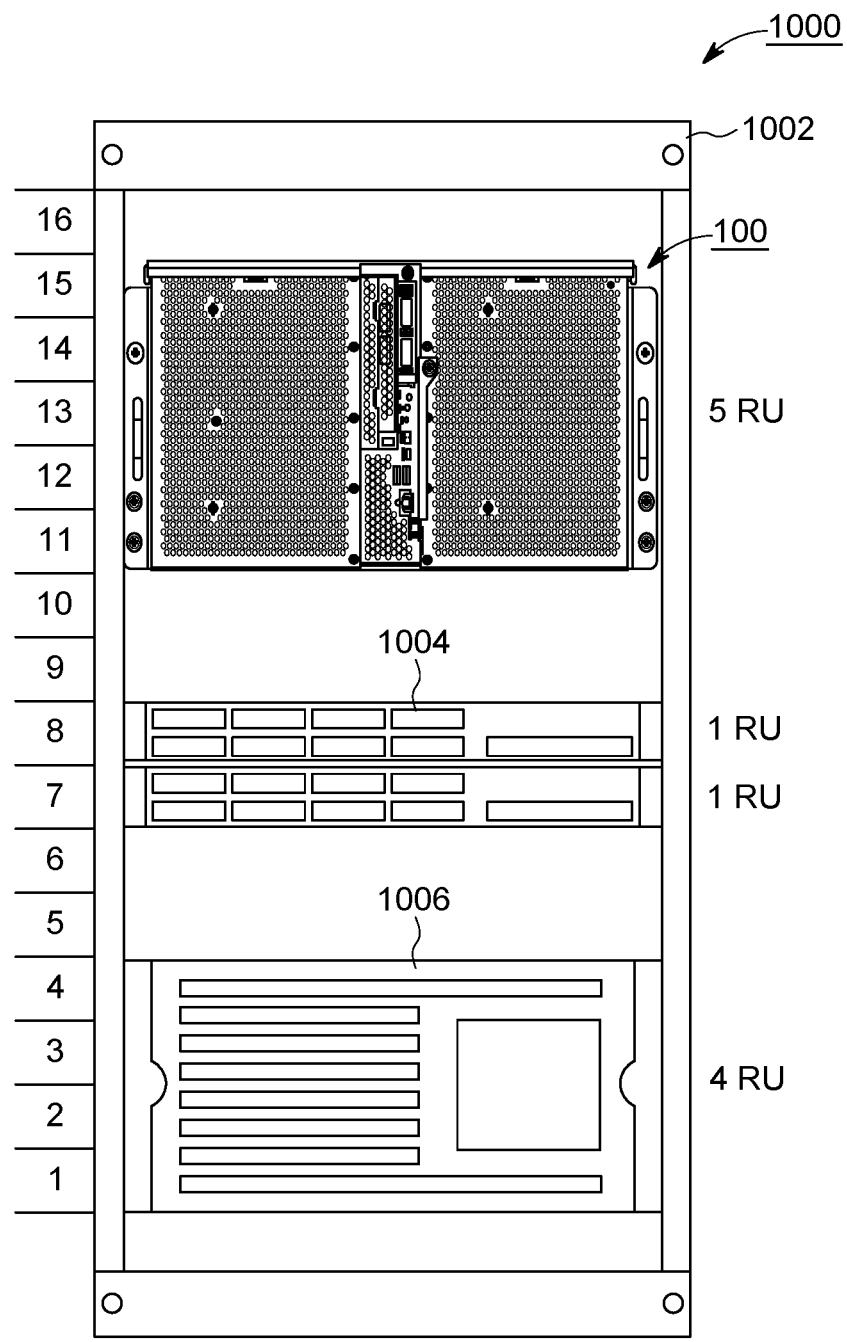
FIG. 10 is a schematic diagram of the rack server of FIGS. 1A-F secured in a cabinet in accordance with embodiments of the present disclosure.

FIG. 10 is a schematic diagram 1000 of the rack server 100 of FIGS. 1A-F secured in a cabinet 1002 in accordance with embodiments of the present disclosure. As shown in FIG. 10, the rack server 100 has a 5 RU form factor. The cabinet 1002 can include receiver areas to secure other components, such as other types of server 1004 and an uninterruptable power supply 1006.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A rack server comprising:
   a rack server chassis;
   a plurality of backplane printed circuit boards (PCBs) coupled to the rack server chassis, each backplane PCB comprising a plurality of cantilevered beams, each cantilevered beam of the plurality of cantilevered beams comprising a receiver slot to receive a server element; and
   a serial attached small computer serial interface (SAS) expander circuit element residing on each backplane PCB, the SAS expander circuit element electrically connected to the receiver slot of each cantilevered beam of the plurality of cantilevered beams;
   wherein the plurality of cantilevered beams comprises:
   a first set of cantilevered beams proximate to a first end of each backplane PCB;
   a second set of cantilevered beams adjacent to the first set of cantilevered beams and residing towards a second end of each backplane PCB, the first end opposite the second end; and
   wherein the SAS expander circuit element resides at a location on each backplane PCB between the first set of cantilevered beams and the second set of cantilevered beams, and
   wherein the SAS expander circuit element is electrically connected to the receiver slot of each cantilevered beam of the first set and second set of cantilevered beams.

2. The rack server of claim 1, further comprising a third set of cantilevered beams adjacent the second set of cantilevered beams, the second set of cantilevered beams between the third set of cantilevered beams and the SAS expander circuit element, wherein the SAS expander circuit element is electrically connected to the receiver slot of each cantilevered beam of the third set of cantilevered beams.

3. The rack server of claim 2, further comprising:
   a first set of electrical traces extending from the SAS expander circuit element to each receiver slot of the first set of cantilevered beams; and
   a second set of electrical traces extending from the SAS expander circuit element to each receiver slot of the second set of cantilevered beams and the third set of cantilevered beams;
   wherein the first set of electrical traces extends towards the first end of each backplane PCB and the second set of electrical traces extends towards the second end of each backplane PCB.

4. The rack server of claim 1, further comprising a PCB connector at the first end of each backplane PCB.

5. The rack server of claim 1, wherein each backplane PCB is a first backplane PCB and the plurality of cantilevered beams is a first plurality of cantilevered beams, the rack server further comprising:
   a second backplane PCB mechanically and electrically connected to a PCB connector of the first backplane PCB, the second backplane PCB comprising:
   a second plurality of cantilevered beams; and
   a second PCB connector electrically connecting the first backplane PCB and the second backplane PCB to a fan board.

6. The rack server of claim 5, further comprising a plurality of first backplane PCBs connected to a plurality of second backplane PCBs.

7. The rack server of claim 5, wherein the first plurality of cantilevered beams of the first backplane PCB comprises fifteen cantilevered beams and the second plurality of cantilevered beams of the second backplane PCB comprises nine cantilevered beams.

8. The rack server of claim 1, wherein the each of the plurality of cantilevered beams comprises an elongated region extending from each backplane PCB, the receiver slot residing on the elongated region, wherein the elongated region comprises:
   a distal end separated from each backplane PCB by an air gap; and
   at least one side separated from each backplane PCB by an air gap.

9. The rack server of claim 1, wherein the rack server chassis comprises a plurality of receivers to secure each backplane PCB to the rack server chassis, the plurality of receivers to offset each backplane PCB from a bottom surface of the rack server chassis, each backplane PCB separated from the bottom surface of the rack server chassis by a gap.

10. The rack server of claim 9, further comprising an air flow diverter extending from the bottom surface of the rack server chassis underneath each backplane PCB in the gap, the air flow diverter to direct air in the gap towards the backplane PCB.

11. The rack server of claim 9, further comprising a fan to pull air from a front end of the rack server towards a back end of the rack server.

12. The rack server of claim 1, wherein the rack server chassis comprises a 5 rack unit form factor.

13. The rack server of claim 1, wherein the server element comprises a hard drive storage element and the receiver slot comprises a connector to electrically connect the hard drive storage element to the backplane PCB.

14. The rack server of claim 1, further comprising a power distribution unit residing proximate at least one of the SAS expander circuits.

15. The rack server of claim 1, further comprising one or more of:
   a node module comprising one or more of a motherboard, a network interface controller, and an interconnect module;
   a host bus adapter;
   two fan modules and eight fans; and
   two power supplies.

16. The rack server of claim 1, further comprising 96 hard disk drives.

17. The rack server of claim 1, comprising:
- a first section comprising two backplane PCBs, each backplane PCB of the first section comprising 24 hard disk drives; and
- a second section comprising two backplane PCBs, each backplane PCB of the second section comprising 24 hard disk drives.

* * * * *